(12) United States Patent
Iinuma et al.

(10) Patent No.: US 7,819,532 B2
(45) Date of Patent: Oct. 26, 2010

(54) PROJECTOR

(75) Inventors: Kazuyuki Iinuma, Azumino (JP);
Katsuyuki Uehara, Azumino (JP);
Masaki Uchida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 929 days.

(21) Appl. No.: 11/550,243

(22) Filed: Oct. 17, 2006

(65) Prior Publication Data
US 2007/0121083 A1    May 31, 2007

(30) Foreign Application Priority Data
Nov. 1, 2005    (JP) .............................. 2005-318195

(51) Int. Cl.
*G03B 21/14*    (2006.01)
*G03B 3/00*    (2006.01)
*G03B 21/20*    (2006.01)
*G02B 7/20*    (2006.01)
*F21V 17/02*    (2006.01)
*F21V 21/26*    (2006.01)

(52) U.S. Cl. ....................... 353/101; 353/102; 359/813; 359/819; 362/319; 362/269

(58) Field of Classification Search ................ 353/100, 353/101, 69, 70, 102, 119; 359/813, 819, 359/822, 823, 694; 362/311.01, 277, 187, 362/319
See application file for complete search history.

(56) References Cited

U.S. PATENT DOCUMENTS

| | | | |
|---|---|---|---|
| 5,860,721 A * | 1/1999 | Bowron et al. .............. 353/101 |
| 5,980,045 A * | 11/1999 | Fujibayashi ................. 353/101 |
| 6,334,686 B1 | 1/2002 | Shiraishi et al. |
| 6,595,645 B2 | 7/2003 | Shiraishi et al. |
| 6,796,660 B2 | 9/2004 | Shiraishi et al. |
| 6,843,567 B2 * | 1/2005 | Lee et al. ....................... 353/31 |
| 7,210,825 B2 | 5/2007 | Watanabe et al. |
| 7,465,054 B2 * | 12/2008 | Howard et al. .............. 353/122 |
| 2002/0044264 A1 * | 4/2002 | Lu ............................. 353/101 |
| 2004/0041985 A1 * | 3/2004 | Kimura et al. ................ 353/70 |

FOREIGN PATENT DOCUMENTS

| | | |
|---|---|---|
| JP | U-2-69406 | 5/1990 |
| JP | A 8-314010 | 11/1996 |
| JP | A-2000-231154 | 8/2000 |
| JP | A-2005-107470 | 4/2005 |

\* cited by examiner

*Primary Examiner*—Georgia Y Epps
*Assistant Examiner*—Ryan Howard
(74) *Attorney, Agent, or Firm*—Oliff & Berridge, PLC

(57) ABSTRACT

A projector includes a light source device, a light modulation device, and an exterior casing. The projector is arranged so as to be installed in a desktop mount position and a ceiling suspension position. The light source device includes an elliptic reflector having a nearly ellipsoidal reflection surface and converging and outputting a luminous flux radiated from a light source lamp in a certain direction, and a parallelizing lens that parallelizes the converged light of the elliptic reflector, and a lens supporting part that supports the parallelizing lens and makes a position of the parallelizing lens relative to the light source device main body changeable according to the position of the projector is provided.

2 Claims, 14 Drawing Sheets

F I G. 7
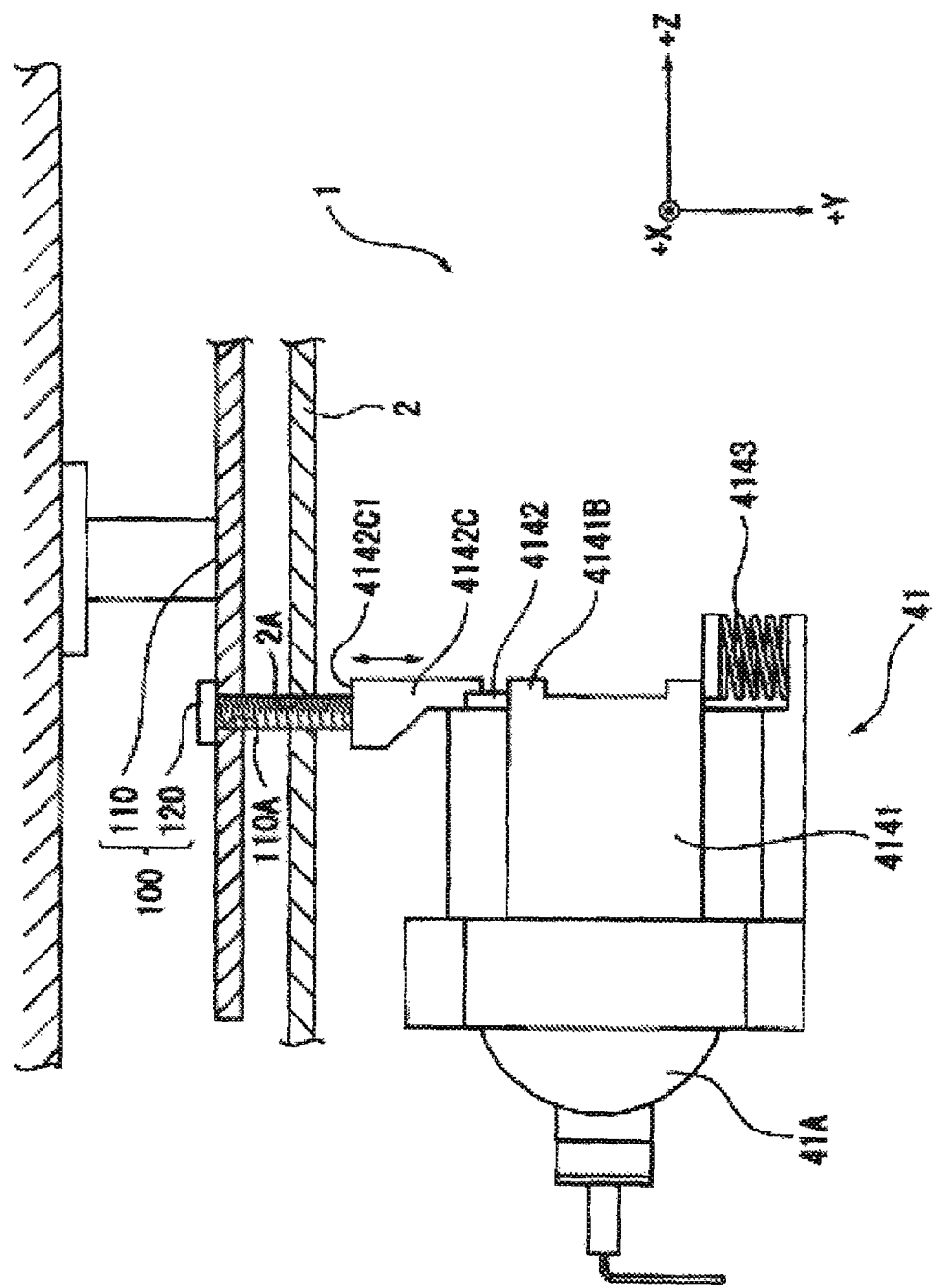

F I G. 13
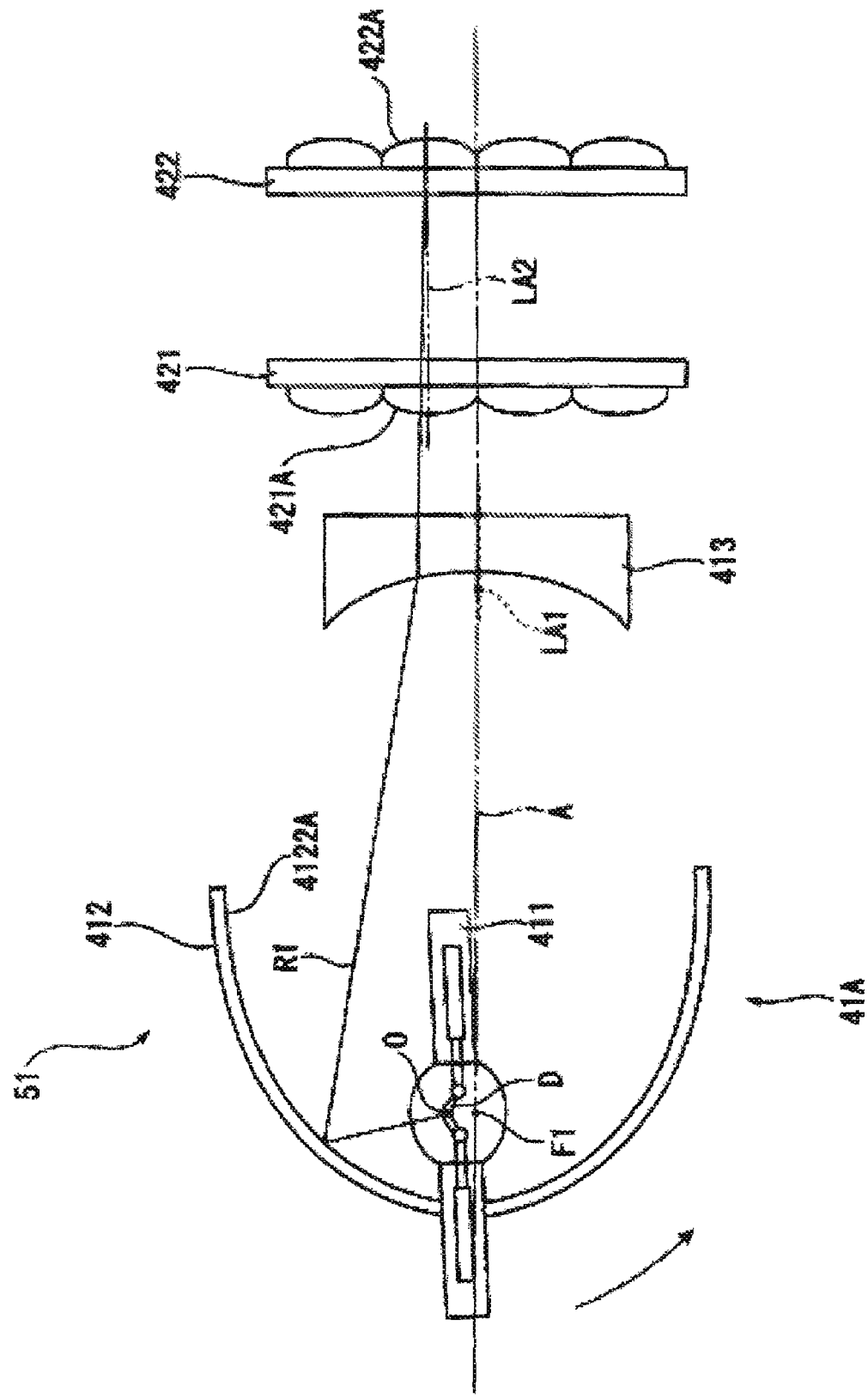

PROJECTOR

BACKGROUND

1. Technical Field

The present invention relates to a projector.

2. Related Art

Previously, a projector including a light source device, a light modulation device that modulates a luminous flux output from the light source device, and a projection optical device that magnifies and projects the modulated luminous flux has been known.

In such a projector, as the light source device, for example, a discharge emission light source device including a light source lamp in which discharge emission is performed between a pair of electrodes and a reflector that aligns and outputs the luminous flux emitted from the light source lamp in a certain direction is often used. In the light source device, the temperature within the light source lamp rises because of heat generation due to light emission and heat convection is caused, a vertical temperature difference is produced within the light source lamp and the gas concentration distribution becomes nonuniform. Accordingly, an arc generated between the pair of electrodes curves upwardly in the vertical direction, the center position of the arc is displaced upwardly in the vertical direction from the center position between the pair of electrodes. At the time of assembly of the light source device, the light source lamp is attached relative to the reflector so that the center position of the arc may be located in a predetermined position of the reflector (e.g., for a parabola reflector, the focal point of the parabola reflector, and for an elliptic reflector, the first focal point of the elliptic reflector).

However, when the projector is compatible between a desktop mount position (a condition in which the projector is mounted on an installation surface of a desk or the like) and a ceiling suspension position (a condition in which the projector is suspended from a ceiling or the like upside down relative to the desktop mount position), top and bottom of the light source device is reversed in the desktop mount position and the ceiling suspension position and the curvature direction of the ark becomes vertically opposite. Accordingly, at the time of assembly of the light source device, in the case where the light source lamp is attached to the reflector as described above in the desktop mount position, when the projector is used in the ceiling suspension position, the center position of the arc is displaced from the predetermined position of the reflector due to inverted curvature of the arc. When the center position of the arc is thus displaced from the predetermined position of the reflector, the optical axis of the luminous flux output from the light source lamp is displaced from the optical axis in design following the optical system provided at the latter part side of the optical path of the light source device. Accordingly, it is impossible to effectively apply the luminous flux output from the light source device to the light modulation device, and the use efficiency of light becomes lower.

Therefore, a projector that is able to improve the use efficiency of light both in the desktop mount position and the ceiling suspension position is proposed (see JP-A-8-314010).

In the projector disclosed in JP-A-8-314010, a lamp unit including a metal halide lamp, a parabola reflector, etc. is formed in a cylindrical shape with an optical axis as a center axis. Further, the inner shape of a lamp unit mounting part in which the lamp unit is mounted is formed in a cylindrical shape corresponding to the outer shape of the lamp unit. The lamp unit is arranged so as to be rotated to 180 degrees with the optical axis as the center axis within the lamp unit mounting part. By the structure, the lamp unit is rotated according to the position of the projector (the desktop mount position and the ceiling suspension position) and the center position of the arc is located in the predetermined position of the reflector.

However, since the projector disclosed in JP-A-8-314010 adopts the structure in which the lamp unit is rotated with the optical axis as the center axis, the operation according to the position of the protector (rotation of the lamp unit) is troublesome.

Further, to smoothly rotate the lamp unit relative to the lamp unit mounting part, a rotation mechanism is required and the light source device is upsized.

Therefore, a technology that is able to improve the use efficiency of light both in the desktop mount position and the ceiling suspension position with a light source device that has a smaller size and a simple structure is desired.

SUMMARY

An advantage of some aspects of the invention is to provide a projector that is able to improve the use efficiency of light both in the desktop mount position and the ceiling suspension position with a light source device that has a smaller size and a simple structure.

A projector according to an aspect of the invention includes: a light source device; a light modulation device that modulates a luminous flux output from the light source device; a projection optical device that magnifies and projects the luminous flux modulated in the light modulation device; and an exterior casing that accommodates the light source device, the light modulation device, and the projection optical device arranged within, the projector is arranged so as to be installed in a desktop mount position in which the projector is mounted on a predetermined location and a ceiling suspension position in which the projector is provided opposite in the vertical direction relative to the desktop mount position, the light source device includes a light source device main body having a light source lamp in which discharge emission is performed between a pair of electrodes and an elliptic reflector having a nearly ellipsoidal reflection surface and converging and outputting a luminous flux radiated from the light source lamp in a certain direction, and a parallelizing lens that parallelizes the converged light of the elliptic reflector, and a lens supporting part that supports the parallelizing lens and makes a position of the parallelizing lens relative to the light source device main body changeable according to the position of the projector is provided.

Here, as the light source device, a configuration in which the light source device main body and the parallelizing concave lens are integrated (unitized) may be adopted, or a configuration in which they are not integrated but separately provided may be adopted.

In the projector, as the light source device, the light source device including the light source device main body having the light source lamp and the elliptic reflector, and the parallelizing lens is adopted. Further, for example, the light source lamp is attached to the elliptic reflector so that the center position of the arc of the light source lamp may be located in the first focal position of the elliptic reflector when the projector is installed in the desktop mount position. When the projector is installed in the ceiling suspension position, the curvature direction of the arc of the light source lamp becomes upside down and the center position of the arc is displaced from the first focal position of the elliptic reflector. Here, since the projector includes the lens supporting part and the position of the parallelizing lens relative to the light source device main body is made changeable according to the position of the projector (the desktop mount position, the ceiling suspension position) by the lens supporting part, the parallelizing lens is set in the position condition according to the displacement of the center point of the arc from the first focal position by the lens supporting part, and thereby, the optical axis of the luminous flux output from the light source device main body can be corrected so as to be coaxial with the optical axis in design of the optical system provided in the latter part of the optical path of the light source device by the position condition of the parallelizing lens. Accordingly, the luminous flux output from the light source device can be effectively applied to the light modulation device, and the use efficiency of light can be improved according to the desktop mount position and the ceiling suspension position of the projector.

Further, in comparison to the previous structure that rotates the lamp unit with the optical axis as the center axis, this structure changes the position of the parallelizing lens having a lighter weight by the lens supporting part, and thereby, the position change of the parallelizing lens can be easily performed and the improvement in the use efficiency of light can be realized without upsizing the light source device but with a simpler structure.

In the projector, it is preferable that the lens supporting part is arranged so as to be movable in the vertical direction, an elastic member that locates the lens supporting part in a predetermined position in the vertical direction by elastic force is provided, a pressing surface extending nearly perpendicularly to the vertical direction is formed in the lens supporting part, and an operation hole for moving the lens supporting part against the elastic force of the elastic member to a position in planer interference with the pressing surface in the vertical direction is formed in a bottom face in the exterior casing.

According to the projector, for example, in the case where the light source lamp is attached to the elliptic reflector so that the center position of the arc of the light source lamp may be located in the first focal position of the elliptic reflector when the projector is installed in the desktop mount position, the lens supporting part can be located in the predetermined position by the elastic force of the elastic member and the parallelizing lens supported by the lens supporting part can be located in the predetermined position relative to the optical axis of the luminous flux output form the light source device main body. Accordingly, when the projector is in the desktop mount position, the optical axis of the luminous flux output from the light source device main body can be made coaxial with the optical axis in design of the optical system provided in the latter part of the optical path of the light source device by the position condition of the parallelizing lens.

Further, in the case of the above described settings, when the projector is installed in the ceiling suspension position, the center position of the arc is displaced upwardly in the vertical direction at the time of ceiling suspension position from the first focal position of the elliptic reflector. That is, the optical axis of the luminous flux output from the light source device main body via the parallelizing lens is displaced from the optical axis in design of the optical system provided in the latter part of the optical path of the light source device.

According to the projector, for example, a connecting member such as a ceiling suspension screw that forms a ceiling suspension device for installing the projector in the ceiling suspension position is inserted into the exterior casing via the operation hole, and thereby, the leading end portion of the connecting member is brought into contact with the pressing surface of the lens supporting part for pressing the lens supporting part, and the lens supporting part can be moved downwardly in the vertical direction at the time of ceiling suspension position against the elastic force of the elastic member. That is, the parallelizing lens is moved in the opposite direction (downwardly in the vertical direction at the time of the ceiling suspension position) to the displacement direction of the arc (upwardly in the vertical direction at the time of the ceiling suspension position) relative to the first focal position when the projector is installed in the ceiling suspension position, and thereby, the optical axis of the luminous flux output from the light source device main body can be corrected so as to be coaxial with the optical axis in design of the optical system provided in the latter part of the optical path of the light source device by the position condition of the parallelizing lens.

Therefore, the use efficiency of light can be improved by moving the lens supporting part with easy operation according to the desktop mount position and the ceiling suspension position of the projector.

In the projector, it is preferable that the lens supporting part is arranged so as to be movable in the vertical direction by its own weight.

In the projector, for example, in the case where the first movement end position (the movement end position at the time of the desktop mount position) and the second movement end position (the movement end position at the time of the ceiling suspension position) when the lens supporting part moves in the vertical direction by its own weight are formed in a member that supports the lens supporting part movable, the lens supporting part moves to the first movement end position by its own weight when the projector is in the desktop mount position and the lens supporting part moves to the second movement end position by its own weight when the projector is in the ceiling suspension position.

Here, for example, in the case where the light source lamp is attached to the elliptic reflector so that the center position of the arc of the light source lamp is located in the first focal position of the elliptic reflector when the projector is installed in the desktop mount position, the first movement end position is set so that the parallelizing lens is located in the predetermined position relative to the optical axis of the luminous flux output from the light source device main body. By the settings, when the projector is in the desktop mount position, the optical axis of the luminous flux output from the light source device main body can be made coaxial with the optical axis in design of the optical system provided in the latter part of the optical path of the light source device by the position condition of the parallelizing lens.

Further, when the projector is installed in the ceiling suspension position, even in the case where the center position of the arc is displaced upwardly in the vertical direction at the time of ceiling suspension position from the first focal position of the elliptic reflector, the lens supporting part moves to the second movement end position by its own weight. That is, the parallelizing lens moves by its own weight in the opposite direction to the displacement direction of the arc (upwardly in she vertical direction at the time of the ceiling suspension position) relative to the first focal position when the projector is installed in the ceiling suspension position, and thereby, the optical axis of the luminous flux output from the light source device main body can be corrected so as to be coaxial with the optical axis in design of the optical system provided in the latter part of the optical path of the light source device by the position condition of the parallelizing lens.

Therefore, there is no need for operation by the user according to the desktop mount position and the ceiling suspension position of the projector, and the use efficiency of light can be improved by moving the lens supporting part with a simple structure.

A projector according to another aspect of the invention includes: a light source device; a light modulation device that modulates a luminous flux output from the light source device; a protection optical device that magnifies and projects the luminous flux modulated in the light modulation device; and an exterior casing that accommodates the light source device, the light modulation device, and the projection optical device arranged within, the projector is arranged so as to be installed in a desktop mount position in which the projector is mounted on a predetermined location and a ceiling suspension position in which the projector is provided opposite in the vertical direction relative to the desktop mount position, the light source device includes a light source device main body having a light source lamp in which discharge emission is performed between a pair of electrodes and an elliptic reflector having a nearly ellipsoidal reflection surface and converging and outputting a luminous flux radiated from the light source lamp in a certain direction, and a parallelizing lens that parallelizes the converged light of the elliptic reflector, and a device main body supporting part that supports the light source device main body, makes the light source device main body rotatable around a horizontal axis nearly perpendicular to an optical axis of the luminous flux output from the light source lamp and the vertical direction, and makes a position of the light source device main body relative to the parallelizing lens changeable according to the position of the projector is provided.

Here, as the light source device, a configuration in which the light source device main body and the parallelizing lens are integrated (unitized) may be adopted, or a configuration in which they are not integrated but separately provided may be adopted In the projector, as the light source device, the light source device including the light source device main body having the light source lamp and the elliptic reflector, and the parallelizing lens is adopted. Further, for example, the light source lamp is attached to the elliptic reflector so that the center position of the arc of the light source lamp may be located in the first focal position of the elliptic reflector when the projector is installed in the desktop mount position. When the projector is installed in the ceiling suspension position, the curvature direction of the arc of the light source lamp becomes upside down and the center position of the arc is displaced from the first focal position of the elliptic reflector. Here, since the projector includes the device main body supporting part and the light source device main body relative to the parallelizing lens is made rotatable around the horizontal axis and the position of the light source device main body relative to the parallelizing lens is made changeable according to the position of the projector (the desktop mount position, the ceiling suspension position) by the device main body supporting part, the light source device main body is set in the position condition according to the displacement of the center position of the arc from the first focal position by the device main body supporting part, and thereby, the optical axis of the luminous flux output from the light source device main body via the parallelizing lens can be corrected so as to be coaxial with the optical axis in design of the optical system provided in the latter part of the optical path of the light source device. Accordingly, the luminous flux output from the light source device can be effectively applied to the light modulation device, and the use efficiency of light can be improved according to the desktop mount position and the ceiling suspension position of the projector.

Further, in comparison to the previous structure that rotates the lamp unit with the optical axis as the center axis, this structure rotates the light source device main body around the horizontal axis nearly perpendicular to the optical axis and the vertical direction at the times of desktop mount position and ceiling suspension position, and thereby, the position change of the light source device main body can be easily performed and the improvement in the use efficiency of light can be realized without upsizing the light source device but with a simpler structure.

In the projector, it is preferable that an elastic member that locates the light source device main body in a predetermined rotation position centered around the horizontal axis relative to the device main body supporting part by elastic force is provided, a pressing surface extending nearly perpendicularly to the vertical direction is formed in the light source device main body, and an operation hole for rotating the light source device main body against the elastic force of the elastic member to a position in planer interference with the pressing surface in the vertical direction is formed in a bottom face in the exterior casing.

According to the projector, for example, in the case where the light source lamp is attached to the elliptic reflector so that the center position of the arc of the light source lamp may be located in the first focal position of the elliptic reflector when the projector is installed in the desktop mount position, the light source device main body is located in the predetermined rotation position by the elastic force of the elastic member. Accordingly, when the projector is in the desktop mount position, the optical axis of the luminous flux output from the light source device main body via the parallelizing lens can be made coaxial with the optical axis in design of the optical system provided in the latter part of the optical path of the light source device.

Further, in the case of the above described settings, when the projector is in the ceiling suspension position, the center position of the arc is displaced upwardly in the vertical direction at the time of ceiling suspension position from the first focal position of the elliptic reflector. That is, the optical axis of the luminous flux output from the light source device main body via the parallelizing lens is displaced from the optical axis in design of the optical system provided in the latter part of the optical path of the light source device.

According to the projector, for example, a connecting member such as a ceiling suspension screw that forms a ceiling suspension device for installing the projector in the ceiling suspension position is inserted into the exterior casing via the operation hole, and thereby, the leading end portion of the connecting member is brought into contact with the pressing surface of the light source device main body for pressing the light source device main body, and the light source device main body can be rotated against the elastic force of the elastic member. For example, the light source device main body is rotated so that the leading end side in the luminous flux exiting direction of the light source device main body may be upper in the vertical direction at the time of the ceiling suspension position and the base end side in the luminous flux exiting direction may be lower in the vertical direction at the time of the ceiling suspension position, and thereby, the optical axis of the luminous flux output from the light source device main body via the parallelizing lens can be corrected so as to be coaxial with the optical axis in design of the optical system provided in the latter part of the optical path of the light source device.

Therefore, the use efficiency of light can be improved by rotating the light source device main body with easy operation according to the desktop mount position and the ceiling suspension position of the projector.

In the protector, it is preferable that a position of the center of gravity of the light source device main body is set in a position displaced from the horizontal axis and the light source device main body is arranged so as to be rotatable around the horizontal axis by its own weight relative to the device main body supporting part.

In the projector, for example, in the case where the first rotation end position (the rotation end position at the time of the desktop mount position) and the second rotation end position (the rotation end position at the time of the ceiling suspension position) when the light device main body rotates by its own weight are formed in the device main body supporting part, the light source device main body rotates to the first rotation end position by its own weight when the projector is in the desktop mount position and the light source device main body rotates to the second rotation end position by its own weight when the projector is in the ceiling suspension position.

Here, for example, in the case where the light source lamp is attached to the elliptic reflector so that the center position of the arc of the light source lamp is located in the first focal position of the elliptic reflector when the projector is installed in the desktop mount position, the first rotation end position is set so that the optical axis of the luminous flux output from the light source device main body via the parallelizing lens may be coaxial with the optical axis in design of the optical system provided in the latter part of the optical path of the light source device. By the settings, when the projector is in the desktop mount position, the optical axis of the luminous flux output from the light source device can be made coaxial with the optical axis in design of the optical system provided in the latter part of the optical path of the light source device.

Further, when the projector is installed in the ceiling suspension position, even in the case where the center position of the arc is displaced upwardly in the vertical direction at the time of ceiling suspension position from the first focal position of the elliptic reflector, the light source device main body moves to the second rotation end position by its own weight. For example, at the time of the ceiling suspension position of the projector, in the case where the light source device main body is set to rotate so that the leading end side in the luminous flux exiting direction of the light source device main body may be upper in the vertical direction at the time of the ceiling suspension position and the base end side in the luminous flux exiting direction may be lower in the vertical direction at the time of the ceiling suspension position, when light source device main body moves to the second rotation end position by its own weight, the optical axis of the luminous flux output from the light source device main body via the parallelizing lens can be corrected so as to be coaxial with the optical axis in design of the optical system provided in the latter part of the optical path of the light source device.

Therefore, there is no need for operation by the user according to the desktop mount position and the ceiling suspension position of the projector, and the use efficiency of light can be improved by rotating the light source device main body with a simple structure.

BRIEF DESCRIPTION OF THE DRAWINGS

The invention will be described with reference to the accompanying drawings, wherein like numbers reference like elements.

FIG. 7 schematically shows a condition of position adjustment of a parallelizing concave lens when the projector is in the ceiling suspension position in the embodiment.

FIG. 13 is a diagram for explanation of the effects of the embodiment.

DESCRIPTION OF EXEMPLARY EMBODIMENTS

First Embodiment

Hereinafter the first embodiment of the invention will be described based on the drawings.

Configuration of Projector

Figure 1:
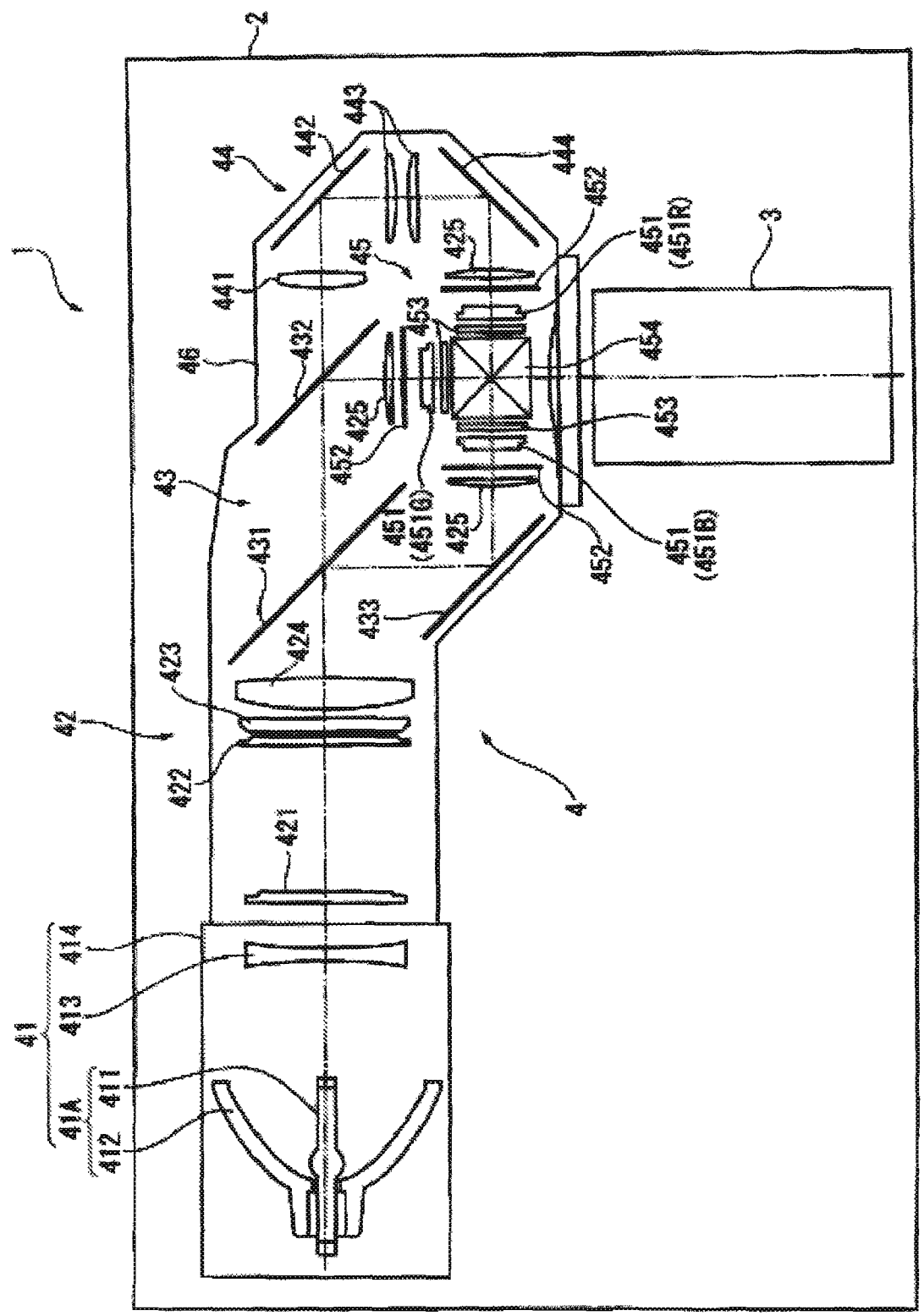
FIG. 1 schematically shows an outline configuration of a projector in the first embodiment.

FIG. 1 schematically shows an outline configuration of a projector 1.

The projector 1 forms an optical image by modulating a luminous flux output from a light source according to image information and magnifies and projects the formed optical image onto a screen (not shown). In the embodiment, the projector 1 is arranged so as to magnify and project the formed optical image onto a screen (not shown) both in a condition in which the projector 1 is mounted on an installation surface of a desk or the like (desktop mount position) and a condition in which the projector is suspended from an installation surface of a ceiling or the like oppositely in the vertical direction to the desktop mount position (ceiling suspension position.) The projector 1 includes an exterior casing 2, a projection lens 3 as a projection optical device, an optical unit 4, etc. as shown in FIG. 1.

In FIG. 1, though omitted in the drawing, a cooling unit including a cooling fan for cooling within the projector 1 and the like, a power supply unit for supplying power to the respective component members within the projector 1, a control device for controlling the entire projector 1, etc. are provided in space for other than the projection lens 3 and the optical unit 4 within the exterior casing 2.

The exterior casing 2 is made of synthetic resin or the like, and, as shown in FIG. 1, formed entirely and substantially in a rectangular parallelepiped shape that accommodates the projection lens 3 and the optical unit 4 arranged within. Although the illustration is omitted, the exterior casing 2 includes an upper case that forms a top face, front face, rear face and side face of the projector 1, respectively and a lower case that forms a bottom face, front face and rear face of the projector 1, respectively, and the upper case and the lower case are secured to each other with screws or the like.

The exterior casing 2 may be formed by other materials than the synthetic resin or the like, and may be made of metal or the like, for example.

The optical unit 4 is a unit for optically processing the luminous flux output from the light source and forming an optical image (color image) corresponding to the image information under the control by the control device. As shown in FIG. 1, the optical unit 4 has nearly an L-shape in the plan view that extends alone the rear face of the exterior casing 2 and extends the side face of the exterior casing 2. The detailed configuration of the optical unit 4 will be described later.

The projection lens 3 magnifies and projects the optical image (color image) formed in the optical unit 4 onto the screen (not shown). The projection lens 3 is formed as a lens set having plural lenses accommodated within a cylindrical lens tube.

Detailed Configuration of Optical Unit

As shown in FIG. 1, the optical unit 4 includes a light source device 41, a uniform illumination system 42, a color separation system 43, a relay system 44, an optical device 45, and a casing for optical components 46 in which these optical components 42 to 45 are accommodated.

The light source device 41 lights a lamp and outputs parallel light toward the uniform illumination system 42 under the control by the control device. As shown in FIG. 1, the light source device 41 includes a light source device main body 41A having a light source lamp 411 and an elliptic reflector 412, a parallelizing concave lens 413, and a lamp housing 414 that accommodates the respective members 411 to 413 within. Further, the radial luminous flux output from the light source lamp 411 is reflected by the elliptic reflector 412 and parallelized via the parallelizing concave lens 413.

The detailed configuration of the light source device 41 will be described later.

The uniform illumination system 42 is an optical system for nearly uniformly applying the luminous flux output from the light source device 41 to an image formation area of a liquid crystal panel that forms the optical device 45, which will be described later. As shown in FIG. 1, the uniform illumination system 42 includes a first lens array 421, a second lens array 422, a polarization conversion element 423, and a superimposing lens 424.

The first lens array 421 has a configuration in which microlenses having substantially rectangular outlines seen from the optical axis direction are arranged in a matrix form. The respective microlenses divide the luminous flux output from the light source device 41 into plural partial luminous fluxes.

The second lens array 422 has nearly the same configuration as that of the first lens array 421 with microlenses arranged in a matrix form. The second lens array 422 has a function of forming images of the respective microlenses of the first lens array 421 on the liquid crystal panel of the optical device 45, which will be described later, together with the superimposing lens 424.

The polarization conversion element 423 is disposed between the second lens array 422 and the superimposing lens 424 for converting the light from the second lens array 422 into nearly a single kind of polarized light.

Specifically, the respective partial lights converted into nearly a single kind of polarized light by the polarization conversion element 423 are finally and nearly superimposed on the liquid crystal panel of the optical device 45, which will be described later, by the superimposing lens 424. Since only a single kind of polarized light is used in the projector using a liquid crystal panel of the type of modulating polarized light, nearly the half of the light from the light source device 41 that emits random polarized light is not available. Accordingly, using the polarization conversion element 423, the output light from the light source device 41 is converted into nearly a single kind of polarized light for improving the use efficiency of light in the optical device 45.

As shown in FIG. 1, the color separation system 43 includes two dichroic mirrors 431, 432 and a reflection mirror 433, and has a function of separating the plural partial luminous fluxes output from the uniform illumination system 42 into color lights of three colors of red, green, and blue by the dichroic mirrors 431, 432.

As shown in FIG. 1, the relay system 44 includes a light incident-side lens 441, a relay lens 443, and reflection mirrors 442, 444, and has a function of guiding the red light separated by the color separation system 43 to the liquid crystal panel for red light of the optical device 45, which will be described later.

At this time, in the dichroic mirror 431 of the color separation system 43, a blue light component of the luminous flux output from the uniform illumination system 42 is reflected and red light component and green light component are transmitted. The blue light reflected by the dichroic mirror 431 is reflected by a reflection mirror 433, passes through a field lens 425 and reaches the liquid crystal panel for blue light of the optical device 45, which will be described later. The field lens 425 converts the respective partial luminous fluxes output from the second lens array 422 into luminous flux in parallel with the center axis (principal ray) thereof. The field lenses 425 provided at the luminous flux incident-side of the other liquid crystal panels for green light and red light have similar functions.

Of the red light and green light transmitted through the dichroic mirror 431, the green light is reflected by the dichroic mirror 432, passes through the field lens 425, and reaches the liquid crystal panel for green light of the optical device 45, which will be described later. On the other hand, the red light is transmitted through the dichroic mirror 432, passes through the relay system 44, further passes through the field lens 425, and reaches the liquid crystal panel for red light of the optical device 45, which will be described later. Using the relay system 44 for the red light is to prevent the reduction of use efficiency of light due to divergence of light or the like because the length of the optical path of the red light is longer than lengths of the optical paths of the other lights, that is, to transmit the partial fluxes incident to the light incident-side lens 441 to the field lens 425 without change.

As shown in FIG. 1, the optical device 45 includes three liquid crystal panels 451 as the light modulation device (the liquid crystal panel for red light is 451R, the liquid crystal panel for green light is 451G, and the liquid crystal panel for blue light is 451B), light incident-side polarizers 452 and light exiting-side polarizers 453 respectively provided at the luminous flux incident side and the luminous flux exiting side of the liquid crystal panels 451, and a cross dichroic prism 454.

Although the specific illustration is omitted, the liquid crystal panel 451 has a structure in which liquid crystal as an electro-optical material is hermetically enclosed between a pair of transparent glass substrates, and the orientation condition of the liquid crystal is controlled according to the drive signal output from the control device and the polarization axis of the polarized luminous flux output from the light incident-side polarizer 452 is changed.

The respective color lights, the polarization directions of which have been aligned nearly in one direction by the polarization conversion element 423, enter the light incident-side polarizers 452. Of the incident luminous fluxes, the light incident-side polarizer 452 transmits only the polarized lights nearly in the same direction as that of the polarization axis of the luminous fluxes aligned in the polarization conversion element 423 and absorbs the other luminous fluxes. The light incident-side polarizer 452 has a structure in which a retardation film is attached to a light transmissive substrate of sapphire glass, crystal, or the like, for example.

The light exiting-side polarizer 453 has nearly the same structure as that of the light incident-side polarizer 452, and transmits only the luminous fluxes having the polarization axis perpendicular to the transmission axis of the luminous fluxes in the light incident-side polarizer 452 of the luminous fluxes output from the liquid crystal panel 451 and absorbs the other luminous fluxes.

The luminous fluxes are modulated according to image information and optical images are formed in the above described liquid crystal panels 451, light incident-side polarizers 452 and light exiting-side polarizers 453.

The cross dichroic prism 454 is an optical element that combines the optical images modulated with respect to each color light output from the light exiting-side polarizers 453 and forms image lights (color image). The cross dichroic prism 454 has a nearly square shape in the plan view formed by bonding four right angle prisms, and two dielectric multilayer films are formed on the interfaces at which the right angle prisms are bonded. These dielectric multilayer films transmit color lights output from the liquid crystal panel 451G and passing through the light exiting-side polarizer 453 and reflects the color lights output from the liquid crystal panels 451R, 451B and passing through the light exiting-side polarizer 453. Thus, the respective color lights are combined to form a color image.

Configuration of Light Source Device

Figure 2:
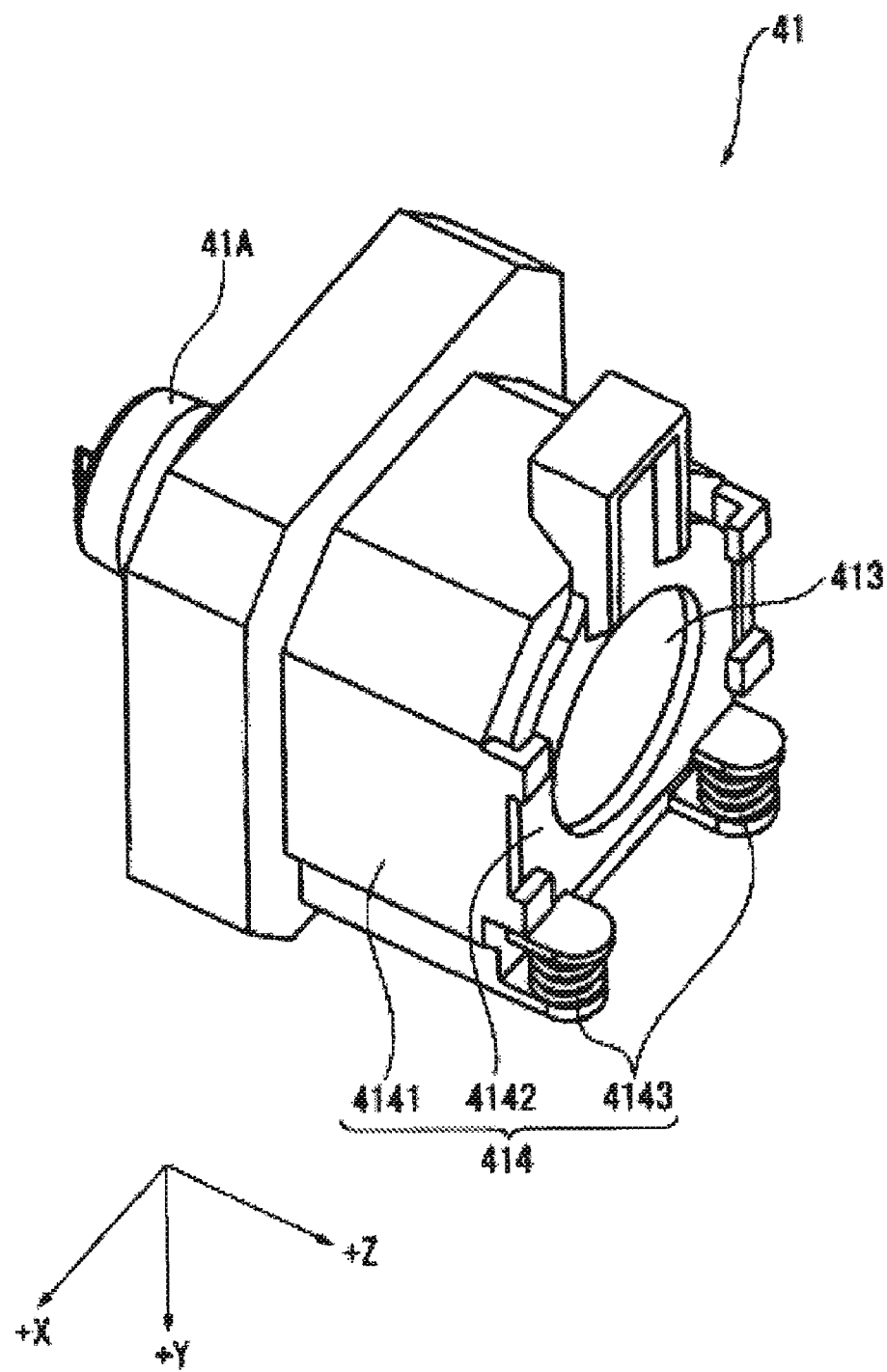
FIG. 2 shows a schematic configuration of a light source device in the embodiment.
Figure 3:
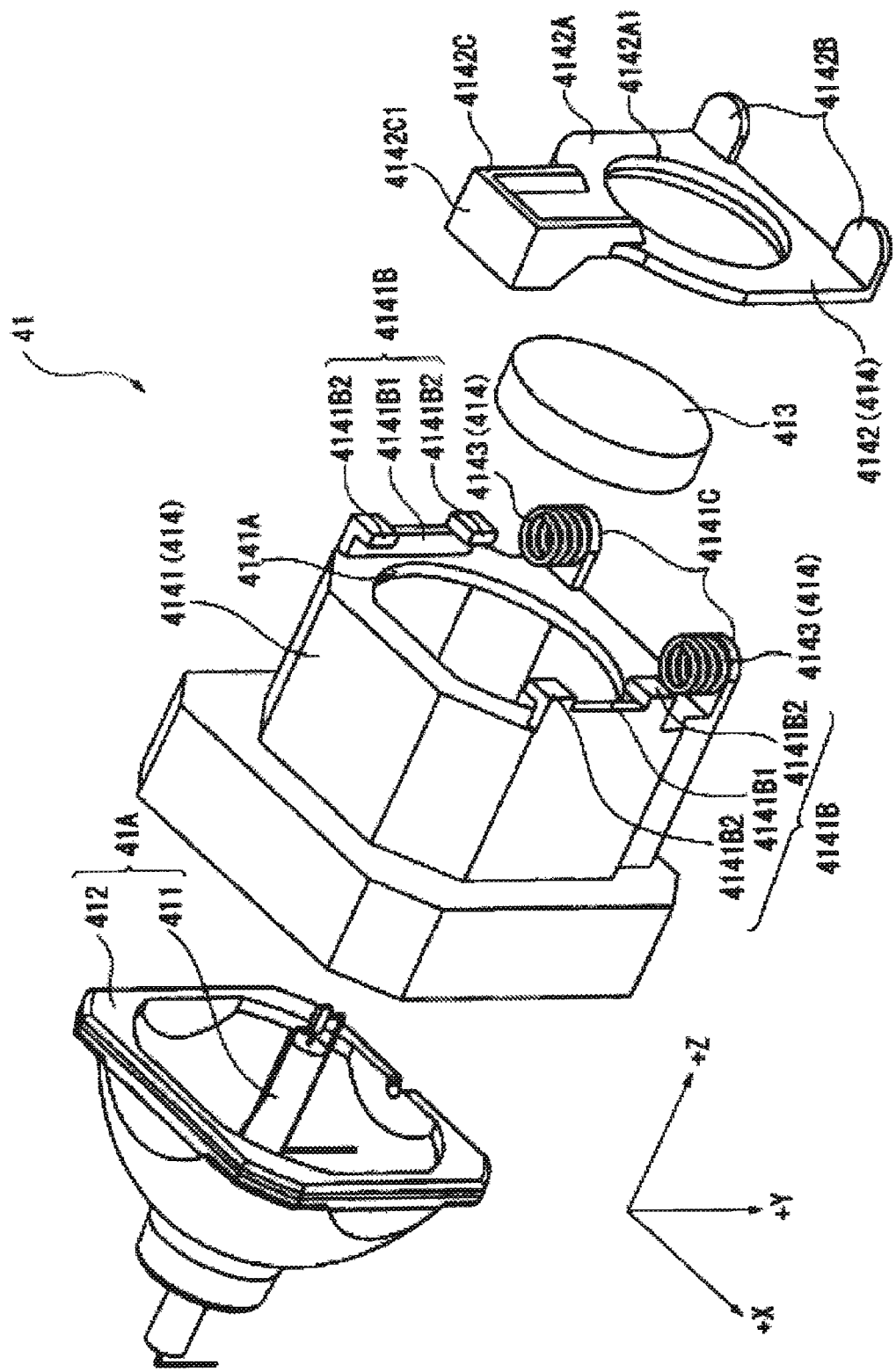
FIG. 3 shows a schematic configuration of the light source device in the embodiment.

FIGS. 2 and 3 show a schematic configuration of the light source device 41. Specifically, FIG. 2 is a perspective view of the light source device 41 seen from below in the vertical direction and the luminous flux exiting side in a condition in which the projector 1 is in the desktop mount position. FIG. 3 is an exploded perspective view of the light source device 41 seen from below in the vertical direction and the luminous flux exiting side in the condition in which the projector 1 is in the desktop mount position.

In FIGS. 2 and 3, for convenience of explanation, the optical axis of the luminous flux output from the light source device 41 is Z-axis, two axes perpendicular to the Z-axis are X-axis (horizontal axis) and Y-axis (vertical axis), respectively. Further, the luminous flux exiting direction from the light source device 41 is +Z-axis direction. Furthermore, the upward in the vertical direction is +Y-axis direction and the downward in the vertical direction is −Y-axis direction when the projector 1 is in the desktop mount position. That is, the upward in the vertical direction is −Y-axis direction and the downward in the vertical direction is +Y-axis direction when the projector 1 is in the ceiling suspension position.

As shown in FIGS. 2 and 3, the light source device 41 includes the light source device main body 41A having the light source lamp 411 (FIG. 3) and the elliptic reflector 412 (FIG. 3), the parallelizing concave lens 413, and the lamp housing 414.

Figure 4:
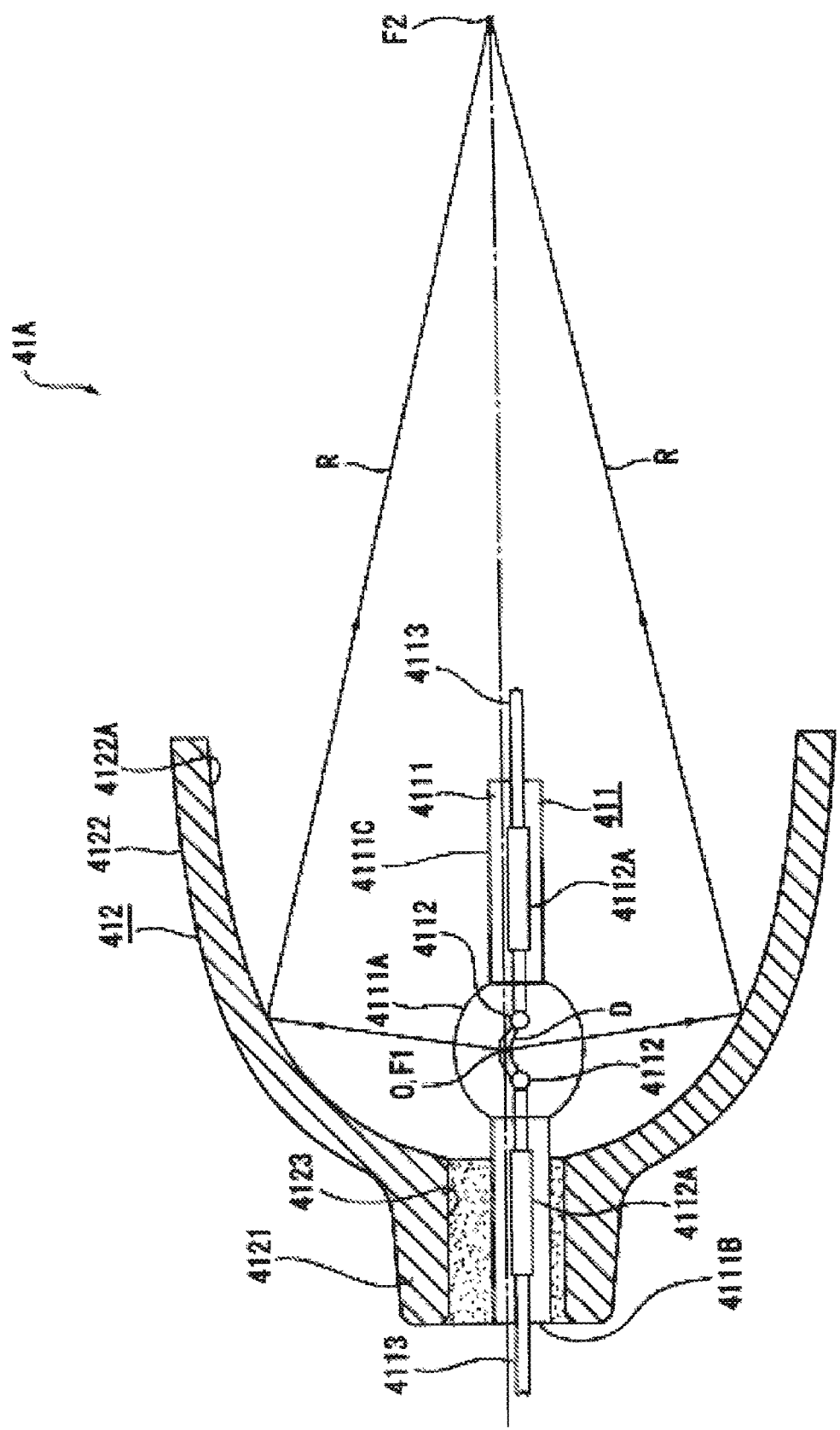
FIG. 4 is a sectional view showing a schematic configuration of a light source device main body in the embodiment.

FIG. 4 is a sectional view showing a schematic configuration of the light source device main body 41A.

As shown in FIG. 4, the light source device main body 41A has a structure in which the light source lamp 411 is provided inside of the elliptic reflector 412.

As shown in FIG. 4, the light source lamp 411 includes an arc tube 4111 of a quartz glass tube, a pair of electrodes 4112 provided within the arc tube 4111, and an enclosed material (not shown).

Here, as the light source lamp 411, various light source lamps that emit light with high brightness may be adopted, and, for example, a metal halide lamp, high-pressure mercury lamp, ultrahigh-pressure mercury lamp, or the like may be adopted.

The arc tube 4111 includes a light emitting part 4111A located at the center and bulging nearly in a spherical shape and a pair of sealing parts 4111B, 4111C extending to both sides of the light emitting part 4111A.

Nearly spherical discharge space is formed in the light emitting part 4111A, and the pair of electrodes 4112, mercury, rare gas, a small amount of halogen, etc. are enclosed within the discharge space.

Metal foils 4112A made of molybdenum that are electrically connected to the pair of electrodes 4112 are inserted into the pair of sealing parts 4111B, 4111C and sealed by a glass material or the like. Lead wires 4113 as electrode lead wires are connected to the respective metal foils 4112A, and the lead wires 4113 extend to the outside of the light source lamp 411.

Further, when a voltage is applied to the lead wires 4113, as shown in FIG. 4, a potential difference is produced between the electrodes 4112 via the metal foils 4112A, and discharge occurs, arc D is generated, and light is emitted within the light emitting part 4111A.

Figure 5:
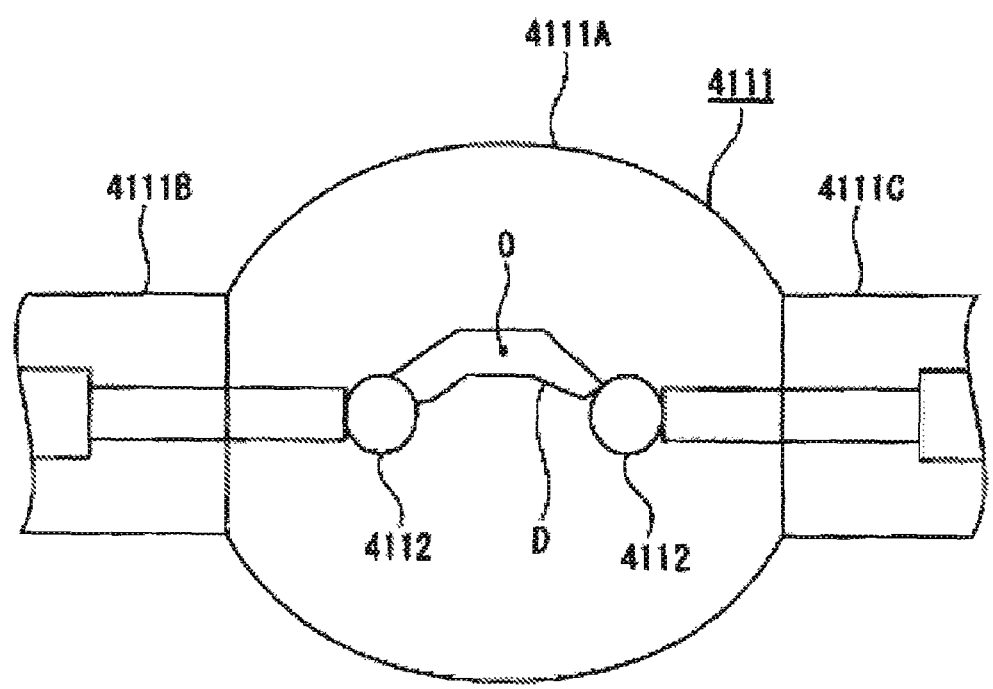
FIG. 5 is a schematic diagram showing the condition of an arc in the embodiment.

FIG. 5 is a schematic diagram showing the condition of arc D.

Within the light emitting part 4111A, temperature rises due to heat generation accompanying light emission and heat convection is produced, a temperature difference is produced vertically, and the concentration distribution of the enclosed material becomes nonuniform. Accordingly, the arc D generated between the part of electrodes 4112 curves upwardly in the vertical direction as shown in FIG. 5. Such a curvature shape of the arc D is generated in the similar fashion both in the desktop mount position and the ceiling suspension position of the projector 1. That is, when the projector 1 is installed in the desktop mount position, the arc D curves upwardly in the vertical direction, i.e., toward the top face side of the projector 1. Further, when the projector 1 is installed in the ceiling suspension position, the arc D curves upwardly in the vertical direction, i.e., toward the bottom face side of the projector 1.

As shown in FIG. 4, the elliptic reflector 412 is an integrally molded member made of glass having translucency and including a tubular neck part 4121 through which one sealing part 4111B at the base end of the light source lamp 411 is inserted and a reflection part 4122 elliptically curved from the neck part 4121.

As shown in FIG. 4, an insertion hole 4123 is formed by molding so as to have a nearly cylindrical shape at the center in the neck part 4121, and the sealing part 4111B is disposed at the center of the insertion hole 4123.

The reflection part 4122 includes a reflection surface 4122A formed by evaporation of a metal thin film on a glass surface having an elliptic curve. Further, the reflection surface 4122A serves as a cold mirror that reflects visible light and transmits infrared and ultraviolet.

As shown in FIG. 4, the light source lamp 411, which is provided within the reflection part 4122 of the elliptic reflector 412 when the light source device main body 41A is assembled, is provided so that the center position O of the arc D curving upwardly in the vertical direction may be close to the first focal position F1 having a rotation curve shape of the reflection surface 4122A of the reflection part 4122 when the projector 1 is in the desktop mount position.

In the case where the projector 1 is in the desktop mount position, when the light source lamp 411 is turned on, as shown in FIG. 4, the luminous flux R toward the elliptic reflector 412 of the luminous fluxes radiated from the light emitting part 4111A becomes converging light that is reflected by the reflection surface 4122A of the reflection part 4122 of the elliptic reflector 412 and converges on the second focal point F2 having a rotation curve shape of the reflection surface 4122A.

As shown in FIGS. 2 and 3, the lamp housing 414 includes a lamp housing main body 4141, a concave lens holder 4142 as a lens supporting part, and two coil springs 4143 as elastic members.

As shown in FIG. 3, the lamp housing main body 4141 is formed by a nearly cylindrical member having a stepped shape with one end increased in diameter and the other end decreased in diameter, and supports the light source device main body 41A at the one end side and supports the parallelizing concave lens 413 via the concave lens holder 4142 at the other end side, and thereby, integrates the light source device main body 41A and the parallelizing concave lens 413. Further, the lamp housing main body 4141 is attached to the bottom face of the lower case of the exterior casing 2 and connected to the casing for optical components 46, and introduces the luminous flux output from the integrated light source device main body 41A and parallelizing concave lens 413 into the casing for optical components 46.

In the lamp housing main body 4141, though specific illustration thereof is omitted, the stepped parts at the one end and the other end form a contact surface in contact with the luminous flux exiting end of the elliptic reflector 412, when the luminous flux exiting end of the elliptic reflector 412 is brought into contact with the contact surface while the light source device main body 41A is inserted into the opening at the one end side, positioning of the light source device main body 41A in the optical axis direction is performed. Further, for example, when the elliptic reflector 412 and the lamp housing main body 4141 are connected by a blade spring or the like (not shown) and the luminous flux exiting end of the elliptic reflector 412 is pressed toward the contact surface, the light source device main body 41A is fixed relative to the lamp housing main body 4141.

Further, in the lamp housing main body 4141, as shown in FIG. 3, a pair of movement assist parts 4141B provided in parallel with X-axis direction with the opening 4141A in between are formed in the periphery of the opening 4141A at the other end side.

These pair of movement assist parts 4141B are parts for guiding the movement of the concave lens holder 4142. As shown in FIG. 3, the pair of movement assist parts 4141B include base portions 4141B1 protecting in the Z-axis direction from the periphery of the opening 4141A and extending in the Y-axis direction and regulating portions 4141B2 extending from the leading end of the base portions 4141B1 toward the opening 4141A side in parallel with the XY plane.

Furthermore, in the lamp housing main body 4141, as shown in FIG. 3, a pair of spring bearing portions 4141C are formed on the periphery of the opening 4141A at the other end side.

These pair of spring bearing portions 4141C extend from the +Y-axis direction side of the periphery of the opening 4141A toward the Z-axis direction in parallel with the XY-plane, and fixes one ends of the two coil springs 4143 at the −Y-axis direction side.

Figure 6:
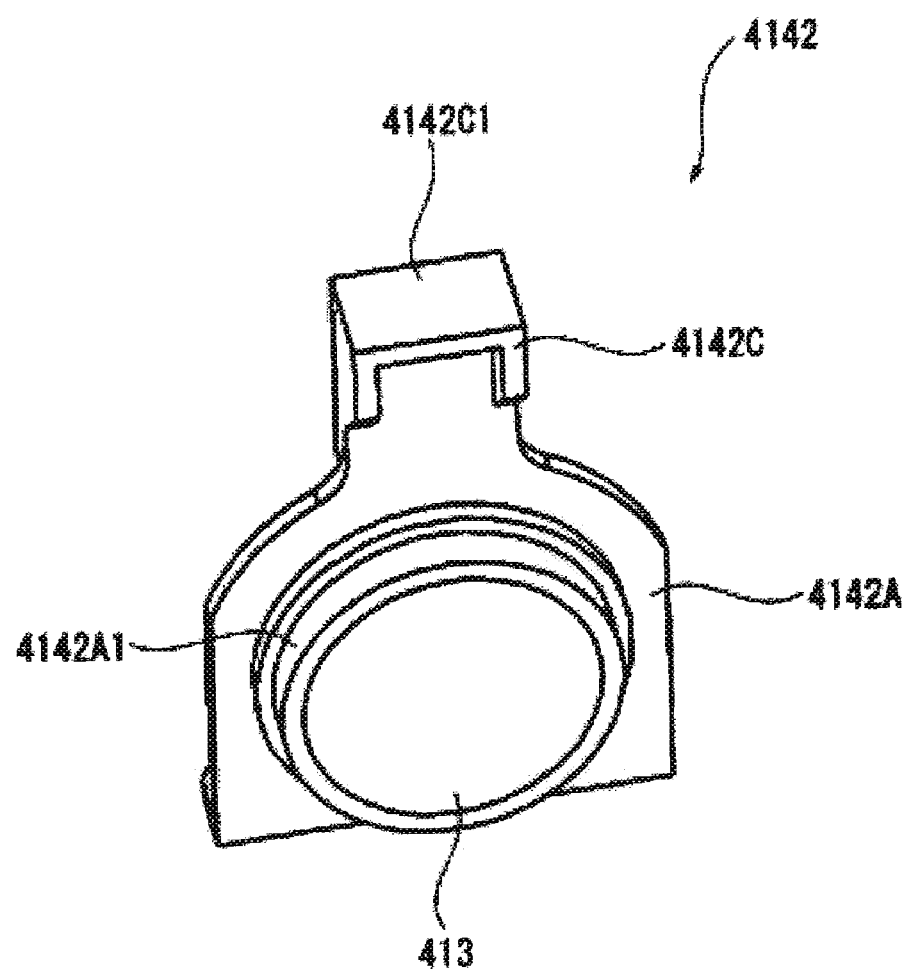
FIG. 6 is a perspective view showing a schematic configuration of a concave lens holder in the embodiment.

FIG. 6 is a perspective view showing a schematic configuration of the concave lens holder 4142. Specifically, FIG. 6 is a perspective view of the condition in which the parallelizing concave lens 413 is fixed to the concave lens holder 4142 seen from the luminous flux incident side.

As shown in FIG. 6, the concave lens holder 4142 is a part for supporting the parallelizing concave lens 413 and performing position adjustment of the parallelizing concave lens 413 relative to the light source device main body 41A according to the position of the projector 1. As shown in FIGS. 3 and 6, the concave lens holder 4142 includes a plate-like body 4142A, a pair of spring bearing portions 4142B (FIG. 3), and an operation part 4142C, and has a structure in which these respective members 4142A, 4142B, 4142C are integrated.

As shown in FIGS. 3 and 6, the plate-like body 4142A is a nearly rectangular plate body in the plan view with an opening 4142A1 according to the outer shape of the parallelizing concave lens 413 nearly at the center. Further, as shown in FIG. 6, the parallelizing concave lens 413 is fitted and fixed into the opening 4142A1. When the concave lens holder 4142 is mounted on the lamp housing main body 4141, the plate-like body 4142A is disposed within the space surrounded by the periphery of the opening 4141A and the pair of movement assist parts 4141B. That is, the dimension in the X-axis direction of the plate-like body 4142A is set to a dimension slightly smaller than the spaced dimension between the respective base portions 4141B1 of the pair of movement assist parts 4141B. Further, the thickness dimension in the Z-axis direction of the plate-like body 4142A is set to a dimension slightly smaller than the spaced dimension between the periphery of the opening 4141A and respective regulating portions 4141B2 of the pair of movement assist parts 4141B. By such settings, the concave lens holder 4142 becomes movable in the Y-axis direction relative to the lamp housing main body 4141.

As shown in FIG. 3, the pair of spring bearing portions 4142B are parts that extend from the end in the +Y-axis direction of the plate-like body 4142A toward the +Z-direction along the XZ plane and connect to the other end sides of the two coil springs 4143.

As shown in FIG. 3 or 6, the operation part 4142C projects from the end in the −Y-axis direction of the plate-like body 4142A toward the −Y-axis direction and has a pressing surface 4142C1 in parallel with the XZ plane on the leading end. In the operation part 4142C, for example, when the projector 1 is in the ceiling suspension position, the pressing surface 4142C1 is pressed in the +Y-axis direction by ceiling suspension screws, which will be described later As shown in FIG. 2 or 3, the two coil springs 4143 are provided between the lamp housing main body 4141 and the concave lens holder 4142 so that the coil axis may be directed toward the Y-axis direction, and the one end sides are fixed to the pair of spring bearing portions 4141C and the other end sides are fixed to the pair of spring bearing portions 4142B.

Further, when the projector 1 is in the desktop mount position, though specific illustration thereof is omitted, the concave lens holder 4142 is suspended from the two spring bearing portions 4142B of the lamp housing main body 4141 via the two coil springs 4143. Here, the lens optical axis of the parallelizing concave lens 413 becomes coaxial with the illumination optical axis A of the light source device main body 41A (the line connecting between the first focal position F1 and the second focal position F2) in a condition in which the weight of the concave lens holder 4142 and the parallelizing concave lens 413 and the elastic force of the two coil springs 4143 are balanced.

By the way, a supporting surface for supporting the concave lens holder 4142 from below in the vertical direction when the concave lens holder 4142 is suspended by the coil springs 4143 may be formed in the lamp housing main body 4141.

FIG. 7 schematically shows a condition of position adjustment of the parallelizing concave lens 413 when the projector 1 is in the ceiling suspension position. In FIG. 7, as well as in FIGS. 2 and 3, the optical axis of the luminous flux output from the light source device 41 is Z-axis, two axes perpendicular to the Z-axis are X-axis (horizontal axis) and Y-axis (vertical axis), respectively.

Further, when the projector 1 is in the ceiling suspension position, as shown in FIG. 7, the bottom face of the exterior casing 2 is fixed to a ceiling suspension device 100. More specifically, as shown in FIG. 7, the ceiling suspension device 100 includes a ceiling suspension device main body 110 fixed to the ceiling, a ceiling suspension screw 120 for connecting the ceiling suspension device main body 110 and the projector 1, etc. The ceiling suspension screw 120 is inserted through an insertion hole 110A formed in the ceiling suspension device main body 110 and screwed in a mounting hole 2A as an operation hole formed in the bottom face of the exterior casing 2 of the projector 1, and thereby, the projector is installed in the ceiling suspension position by the ceiling suspension device 100. As shown in FIG. 7, the mounting hole 2A is formed in a position in planer interference with the pressing surface 4142C1 of the operation part 4142C in the Y-axis direction. Accordingly, as shown in FIG. 7, the leading end portion of the ceiling suspension screw 120 is in contact with the pressing surface 4142C1 of the operation part 4142C that forms the lamp housing 414, the ceiling suspension device main body 110 and the projector 1 are fixed by the ceiling suspension screw 120 and thereby the ceiling suspension screw 120 presses the pressing surface 4142C1 in the +Y-axis direction (downward in FIG. 7), and the concave lens holder 4142 moves in the +Y-axis direction against the elastic force by the two coil springs 4143. That is, the parallelizing concave lens 413 fixed to the concave lens holder 4142 moves in the +Y-axis direction from the above described position at the time of the desktop mount position.

When the projector 1 is changed from the ceiling suspension position to the desktop mount position, the concave lens holder 4142 moves in the −Y-axis direction by the elastic force of the two coil springs 4143, and the lens optical axis of the parallelizing concave lens 413 and the illumination optical axis A of the light source device main body 41A become coaxial with each other as described above.

According to the above described first embodiment, there are the following effects.

Figure 8:
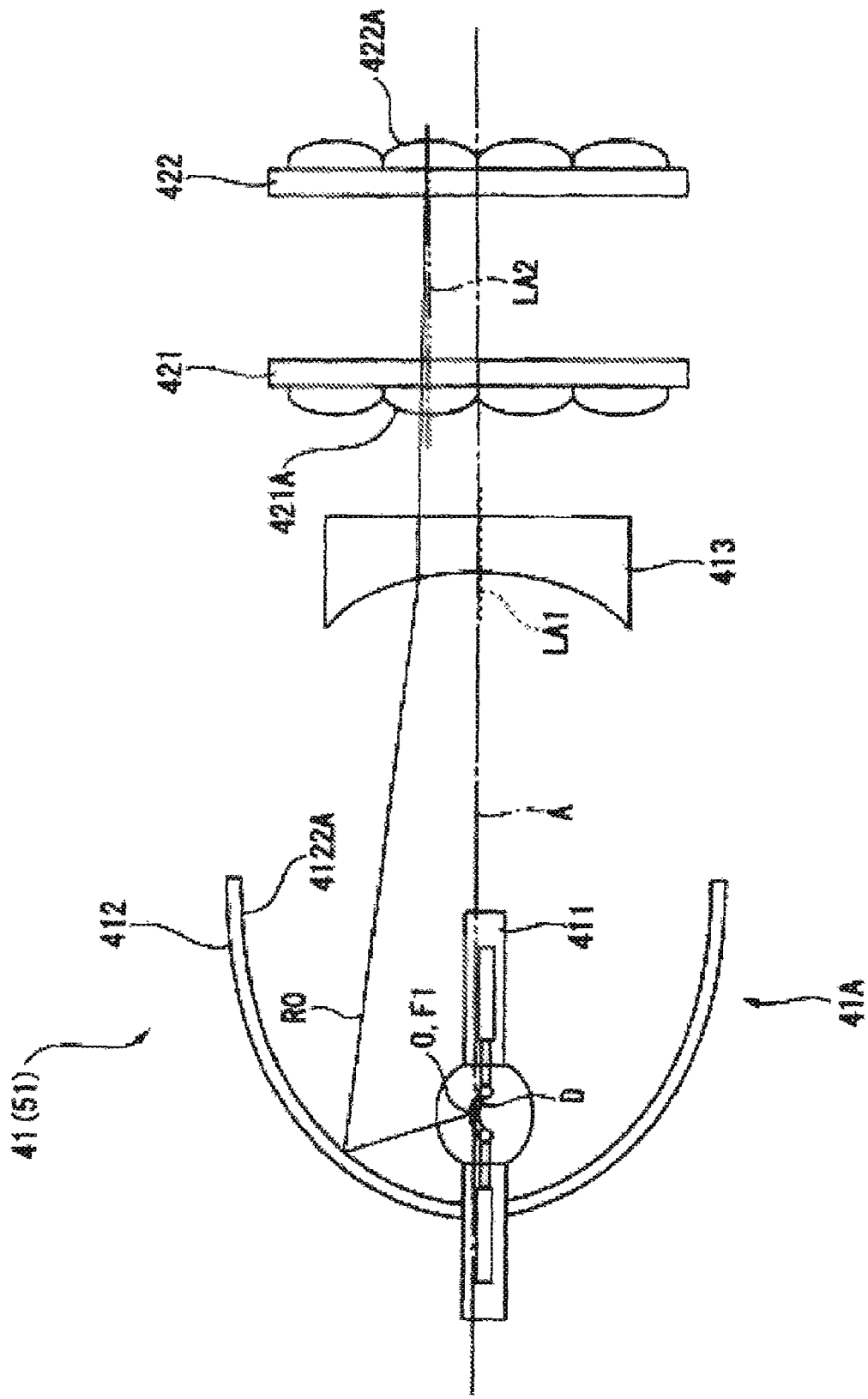
FIG. 8 is a diagram for explanation of the effects of the embodiment.
Figure 9:
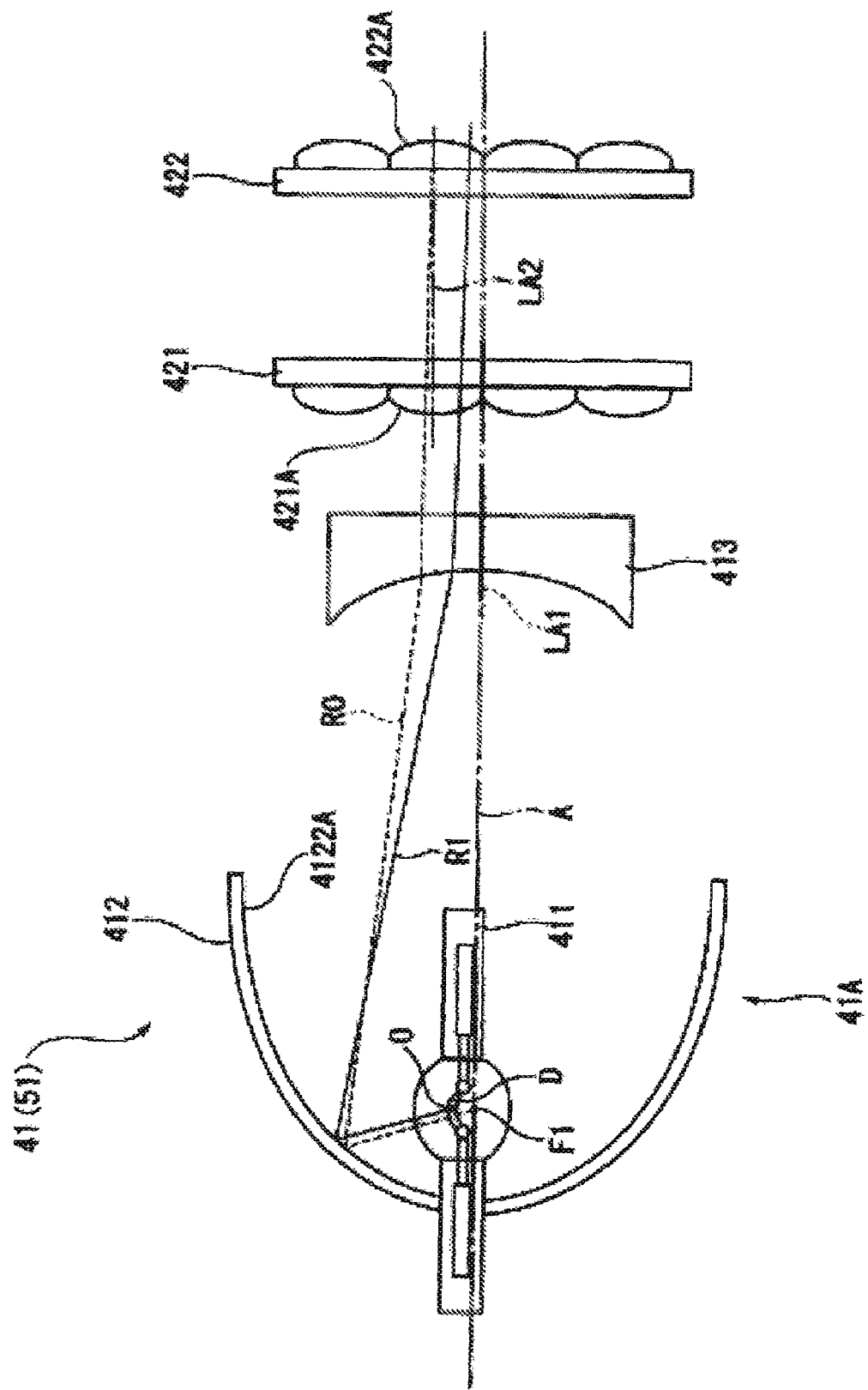
FIG. 9 is a diagram for explanation of the effects of the embodiment.
Figure 10:
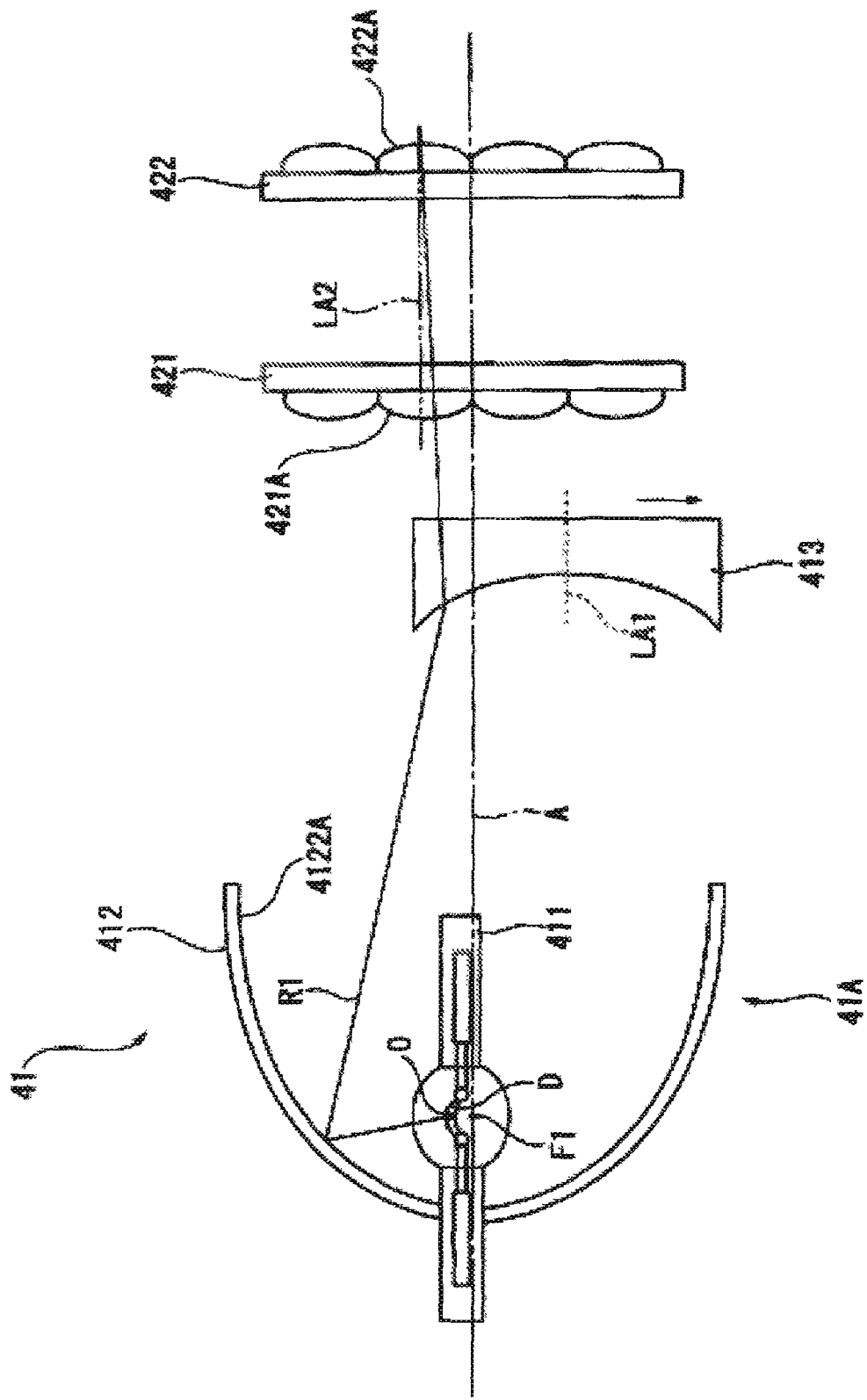
FIG. 10 is a diagram for explanation of the effects of the embodiment.

FIGS. 8 to 10 are diagrams for explanation of the effects of the first embodiment. Specifically, FIG. 8 schematically shows a locus of a luminous flux output from the arc D of the light source lamp 411 toward the first lens array 421 and the second lens array 422 provided in the latter part of the optical path of the light source device 41 when the projector 1 is in the desktop mount position. FIG. 9 schematically shows a locus of a luminous flux output from the arc D of the light source lamp 411 toward the first lens array 421 and the second lens array 422 provided in the latter part of the optical path of the light source device 41 when the projector 1 is in the ceiling suspension position and the position adjustment of the parallelizing concave lens 413 is not performed. FIG. 10 schematically shows a locus of a luminous flux output from the arc D of the light source lamp 411 toward the first lens array 421 and the second lens array 422 provided in the latter part of the optical path of the light source device 41 when the projector 1 is in the ceiling suspension position and the position adjustment of the parallelizing concave lens 413 is performed.

In the embodiment, when the projector 1 is in the desktop mount position, the light source lamp 411 is set so that the center position O of the arc D curving upwardly in the vertical direction may be close to the first focal position F1 of the elliptic reflector 412. Further, when the projector 1 is in the desktop mount position, the parallelizing concave lens 413 is set so that the lens optical axis LA1 may be coaxial with the illumination optical axis A. Accordingly, for example, as shown in FIG. 8, part R0 (the luminous flux that forms an arc image on the second lens array 422 by a predetermined microlens 421A of the first lens array 421) of the luminous flux output from the arc D of the light source lamp 411 passes through the lens optical axis LA2 of the microlens 421A of the first lens array 421 via the elliptic reflector 412 and the parallelizing concave lens 413, and forms an image on a microlens 422A corresponding to the microlens 421A in the second lens array 422. That is, when the projector 1 is in the desktop mount position, the optical axis of the luminous flux output from the light source device 41 (part R0 of the luminous flux and the like) is nearly coaxial with the lens optical axes (lens optical axis LA2 etc.) of the respective microlenses 421A of the first lens array 421 provided in the latter part of the optical path of the light source device 41. In this condition, images of the respective microlenses 421A of the first lens array 421 can be effectively formed on the liquid crystal panels 451 by the second lens array 422 and the superimposing lens 424, and the use efficiency of light can be improved by effectively applying the luminous fluxes output from the light source device to the liquid crystal panels 451.

However, when the projector 1 is in the ceiling suspension position, as shown in FIG. 9, the curvature direction of the arc D of the light source lamp 411 becomes upside down, and the center position O of the arc D displaces from the first focal position F1 of the elliptic reflector 412. Then, as shown in FIG. 9, part R1 (the luminous flux that forms an arc image on the second lens array 422 by a predetermined microlens 421A of the first lens array 421) of the luminous flux output from the arc D of the light source lamp 411 toward the elliptic reflector 412 nearly in parallel with the part R0 of the luminous flux output from the arc D when the projector 1 is in the desktop mount position as described above enters the luminous flux exiting side of the reflection surface 4122A in the elliptic reflector 412 relative to the part R0 of the luminous flux. Accordingly, the incident angle of the part R1 of the luminous flux to the elliptic reflector 412 is smaller than that of the part R0 of the luminous flux, and the part R1 enters the lower side in the vertical direction when the projector 1 is in the ceiling suspension position in the parallelizing concave lens 413, passes through the position greatly displaced from the lens optical axis LA2 of the microlens 421A of the first lens array 421 via the parallelizing concave lens 413, and forms an image in a position greatly displaced from the microlens 422A corresponding to the microlens 421A in the second lens array 422. That is, when the projector 1 is in the ceiling suspension position, the optical axis of the luminous flux (part R1 and the like of the luminous flux) output from the light source device 41 is displaced from the lens optical axes (lens optical axis LA2 etc.) of the respective microlenses 421A of the first lens array 421 provided in the latter part of the optical path of the light source device 41. In this condition when images of the respective microlenses 421A of the first lens array 421 are formed on the liquid crystal panels 451 by the second lens array 422 and the superimposing lens 424, the amount of the luminous flux applied to the liquid crystal panels 451 becomes smaller and the use efficiency of light becomes lower.

In the embodiment, the projector 1 includes the concave lens holder 4142 and the position of the parallelizing concave lens 413 relative to the light source device main body 41A is made changeable according to the position of the projector 1 (the desktop mount position, the ceiling suspension position) by the concave lens holder 4142. Therefore, as shown in FIG. 10, since the parallelizing concave lens 413 is set to the position condition according to the displacement of the center position O of the arc D from the first focal position F1 with the concave lens holder 4142, the part R1 of the luminous flux output from the light source device main body 41A can be corrected so as to pass close to the optical axis LA2 of the microlens 421A of the first lens array 421 provided in the latter part of the optical path of the light source device 41. That is, the optical axis of the luminous flux (part R0 and the like of the luminous flux) output from the light source device 41 can be corrected so as to be nearly coaxial with the lens optical axes (lens optical axis LA2 etc.) of the respective microlenses 421A of the first lens array 421 provided in the latter part of the optical path of the light source device 41. Accordingly, when the projector 1 is in the ceiling suspension position as well as when the projector 1 is in the desktop mount position, images of the respective microlenses 421A of the first lens array 421 can be effectively formed on the liquid crystal panels 451 by the second lens array 422 and the superimposing lens 424, and the use efficiency of light can be improved by effectively applying the luminous fluxes output from the light source device 41 to the liquid crystal panels 451.

Further, in comparison to the previous structure that rotates the lamp unit with the optical axis as the center axis, this structure changes the position of the parallelizing concave lens 413 having a lighter weight by the concave lens holder 4142, end thereby, the position change of the parallelizing concave lens 413 can be easily performed and the improvement in the use efficiency of light can be realized without upsizing the light source device 41 but with a simpler structure.

Here, when the projector 1 is installed in the desktop mount position, the concave lens holder 4142 is located in a predetermined position by the elastic force of the two coil springs 4143, and the lens optical axis LA1 of the parallelizing concave lens 413 supported by the concave lens holder 4142 can be located coaxial with the illumination optical axis A. Accordingly, when the projector 1 is in the desktop mount position, the optical axis of the luminous flux (part R0 and the like of the luminous flux) output from the light source device 41 is made nearly coaxial with the lens optical axes (lens optical axis LA1 etc.) of the respective microlenses 421A of the first lens array 421 provided in the latter part of the optical path of the light source device 41 with the simple structure, and the use efficiency of light can be improved.

Further, when the projector 1 is installed in the ceiling suspension position, the leading end portion of the ceiling suspension screw 120 that forms the ceiling suspension device 100 is screwed in the mounting hole 2A, and the leading end portion of the ceiling suspension screw 120 is in contact with the pressing surface 4142C1 of the concave lens holder 4142 for pressing the concave lens holder 4142 and the concave lens holder 4142 can be moved downwardly in the vertical direction at the time of the ceiling suspension position against the elastic force by the two coil springs 4143. That is, as shown in FIG. 10, the parallelizing concave lens 413 is moved in the opposite direction (downwardly in the vertical direction at the time of the ceiling suspension position) to the displacement direction of the arc D (upwardly in the vertical direction at the time of the ceiling suspension position) relative to the first focal position F1 when the projector 1 is in the ceiling suspension position, and thereby, the incident angle of the part R1 of the luminous flux to the parallelizing concave lens 413 is made larger and the part R1 of the luminous flux via the parallelizing concave lens 413 can be corrected so as to pass close to the lens optical axis LA2 of the microlens 421A of the first lens array 421. That is, the optical axis of the luminous flux (part R0 and the like of the luminous flux) output from the light source device 41 can be corrected so as to be nearly coaxial with the lens optical axes (lens optical axis LA2 etc.) of the respective microlenses 421A of the first lens array 421 provided in the latter part of the optical path of the light source device 41.

Therefore, the use efficiency of light can be improved by moving the concave lens holder 4142 with simple operation according to the desktop mount position and the ceiling suspension position of the projector 1.

Further, since the light source device main body 41A, the parallelizing concave lens 413, and the concave lens holder 414 are integrated (unitized) by the lamp housing main body 4141, when the light source device 41 is manufactured, the location of the parallelizing concave lens 413 relative to the light source device main body 41A when the projector 1 is in the desktop mount position and the location of the parallelizing concave lens 413 relative to the light source device main body 41A when the projector 1 is in the ceiling suspension position can be easily set.

Second Embodiment

Next, the second embodiment of the invention will be described based on the drawings.

In the description as below, the same signs are assigned to the same structure and the same parts as those in the first embodiment, and the detailed description thereof will be omitted or simplified.

Figure 11:
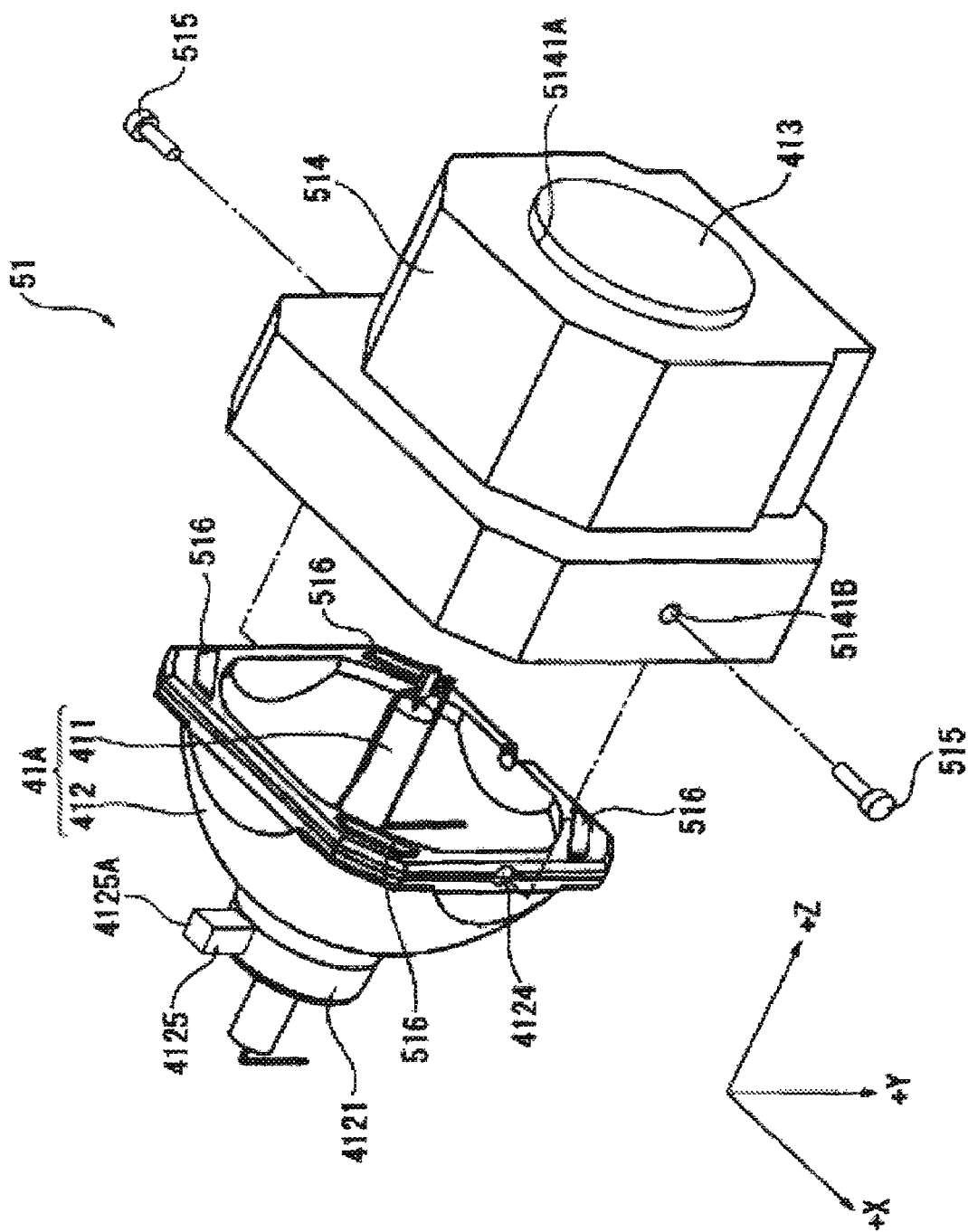
FIG. 11 is an exploded perspective view showing a configuration of a light source device in the second embodiment.

FIG. 11 is an exploded perspective view showing a configuration of a light source device 51 in the second embodiment. In FIG. 11, as well as in FIGS. 2, 3, and 7, for ease of the explanation, the optical axis of the luminous flux output from the light source device 51 is Z-axis, two axes perpendicular to the Z-axis are X-axis (horizontal axis) and Y-axis (vertical axis), respectively.

In the first embodiment, the structure in which the parallelizing concave lens 413 is vertically moved according to the position of the projector 1 is adopted.

On the other hand, in the second embodiment, as shown in FIG. 11, a structure in which, instead of vertical movement of the parallelizing concave lens 413, the light source device main body 41A is rotated according to the position of the projector 1 around the horizontal axis nearly perpendicular to the illumination optical axis A and the vertical direction is adopted. The other constitution than the light source device 51 is the same as that in the first embodiment.

The light source device 51 includes a lamp housing 514 as a device main body supporting part in addition to the light source device main body 41A and the parallelizing concave lens 413 those have been described in the first embodiment.

As shown in FIG. 11, the lamp housing 514 has nearly the same shape as that of the lamp housing main body 4141 that has been described in the first embodiment. Specifically, the lamp housing 514 has nearly the same shape as that of the lamp housing main body 4141 with the pair of movement assist parts 4141B and the pair of spring bearing portions 4141C omitted. Further, the parallelizing concave lens 413 is fixed to an opening 5141A at the other end side of the lamp housing 514.

In the lamp housing 514, as shown in FIG. 11, on both end surfaces in the X-axis direction at the one end side increased in diameter, in a position on the XZ plane containing the lens optical axis of the parallelizing concave lens 413 fixed to the lamp housing 514, a pair of shaft insertion holes 5141B for rotatably mounting the light source device main body 41A are formed.

In the elliptic reflector 412 in the embodiment, as shown in FIG. 11, a pair of shaft insertion holes 4124 corresponding to the pair of shaft insertion holes 5141B of the lamp housing 514 are formed. In a condition in which the light source device main body 41A is inserted into the opening at the one end side of the lamp housing 514, when a pair of rotation shafts 515 (FIG. 11) are inserted into the pair of shaft insertion holes 5141B and the pair of shaft insertion holes 4124, the light source device main body 41A is rotatably and axially supported by the pair of rotation shafts 515 around the horizontal axis relative to the lamp housing 514.

Further, as shown in FIG. 11, in the elliptic reflector 412, a pressing part 4125 having a pressing surface 4125A in contact with the leading end of the ceiling suspension screw 120 that has been described in the first embodiment is mounted on the outer periphery of the tubular neck part 4121. As shown in FIG. 11, the pressing part 4125 has a substantially rectangular parallelepiped shape, and is mounted on the outer periphery of the tubular neck part 4121 so that the pressing surface 4125A may be nearly in parallel with the XZ plane.

Furthermore, as shown in FIG. 11, elastic members 516 such as springs or rubber are provided between the stepped parts at the one end and the other end within the lamp housing 514 and the luminous flux exiting end of the elliptic reflector 412.

When the projector 1 is in the desktop mount position, though specific illustration thereof is omitted, the rotation position of the light source device main body 41A relative to the lamp housing 514 is located in a condition in which the weight of the light source device main body 41A and the elastic force of the elastic members 516 are balanced. In this condition, as well as in the first embodiment, the lens optical axis of the parallelizing concave lens 413 becomes coaxial with the illumination optical axis A of the light source device main body 41A (the line connecting between the first focal position F1 and the second focal position F2).

Figure 12:
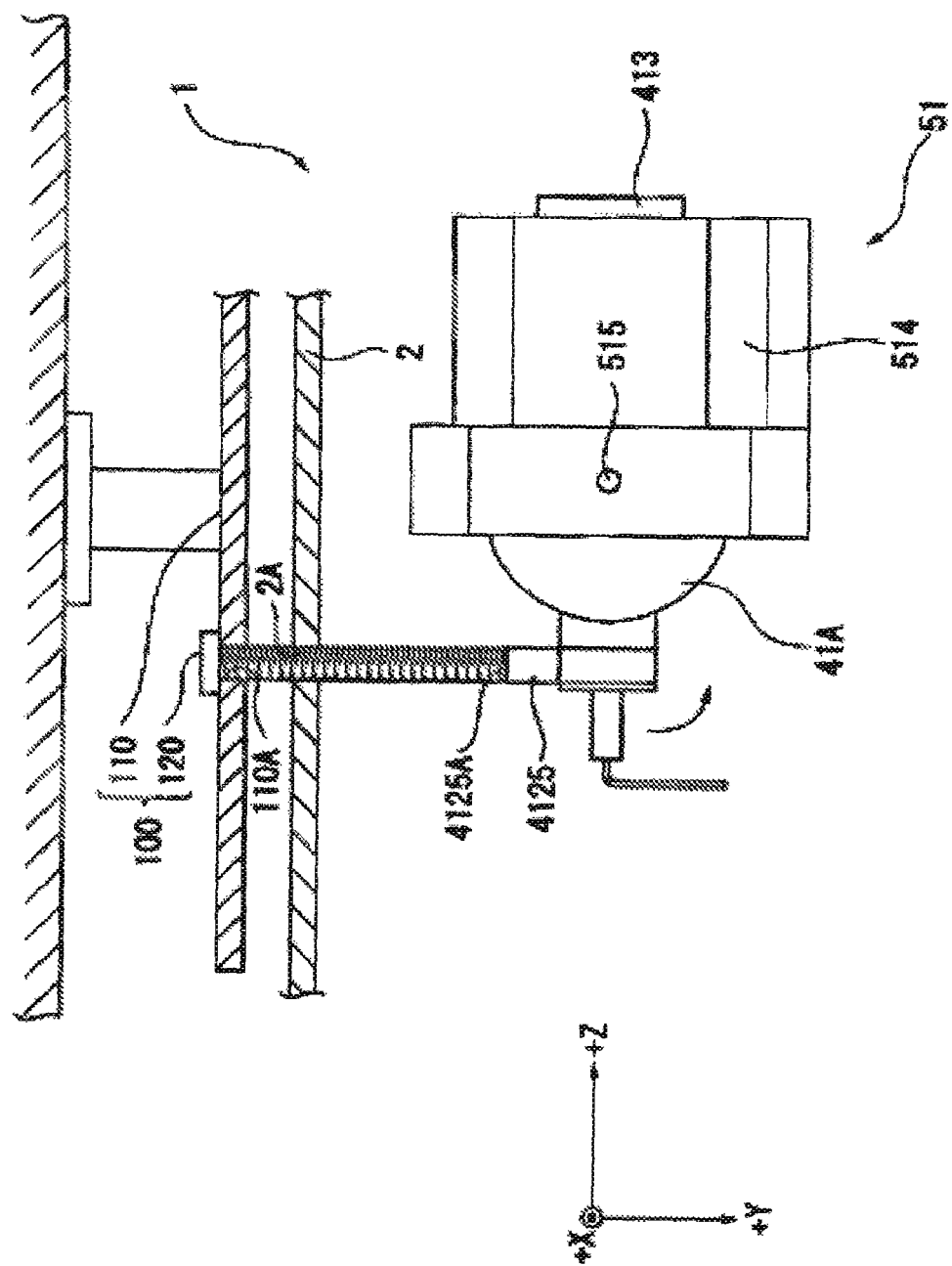
FIG. 12 schematically shows a condition of position adjustment of the light source device main body when the projector is in the ceiling suspension position in the embodiment.

FIG. 12 schematically shows a condition of position adjustment of the light source device main body 41A when the projector 1 is in the ceiling suspension position. In FIG. 12, as well as in FIGS. 2, 3, 7, and 11, the optical axis of the luminous flux output from the light source device 51 is Z-axis, two axes perpendicular to the Z-axis are X-axis (horizontal axis) and Y-axis (vertical axis), respectively.

Further, as shown in FIG. 12, the mounting hole 2A is formed in a position in planer interference with the pressing surface 4125A of the pressing part 4125 in the Y-axis direction. Accordingly, as shown in FIG. 12, when the projector 1 is in the ceiling suspension position, the leading end portion of the ceiling suspension screw 120 is in contact with the pressing surface 4125A of the pressing part 4125 of the elliptic reflector 412, the ceiling suspension device main body 110 and the projector 1 are fixed by the ceiling suspension screw 120 and thereby the ceiling suspension screw 120 presses the pressing surface 4125A in the +Y-axis direction (downward in FIG. 12), and the light source device main body 41A rotates in the +Y-axis direction against the elastic force by the elastic members 516 around the rotation shafts 515. That is, the illumination optical axis A of the light source device main body 41A rotates around the rotation shafts 515 and the illumination optical axis A and the lens optical axis of the parallelizing concave lens 413 intersect with each other.

When the projector is changed from the ceiling suspension position to the desktop mount position, the light source device main body 41A rotates around the rotation shafts 515 in the −Y-axis direction by the elastic force of the elastic members 516, and the lens optical axis of the parallelizing concave lens 413 and the illumination optical axis A of the light source device main body 41A become coaxial with each other as described above.

According to the above described second embodiment, there are the following effects.

FIG. 13 is a diagram for explanation of the effects of the second embodiment. Specifically, FIG. 13 schematically shows a locus of a luminous flux output from the arc D of the light source lamp 411 toward the first lens array 421 and the second lens array 422 provided in the latter part of the optical path of the light source device 51 when the projector 1 is in the ceiling suspension position and the position adjustment of the light source device main body 41A is performed.

In the embodiment, when the projector 1 is in the desktop mount position, as well as in the first embodiment, as shown in FIG. 8, the condition in which the optical axis of the luminous flux output from the light source device 51 (part R0 of the luminous flux and the like) is nearly coaxial with the lens optical axes (lens optical axis LA1 etc.) of the respective microlenses 421A of the first lens array 421 provided in the latter part of the optical path of the light source device 51 can be set, and the use efficiency of light can be improved.

Further, the projector 1 includes the lamp housing 514 and the light source device main body 41A is made rotatable around the pair of rotation shafts 515 according to the position of the projector 1 (the desktop mount position, the ceiling suspension position) by the lamp housing 514 and thereby the position of the light source device main body 41A relative to the parallelizing concave lens 413 is made changeable. Therefore, as shown in FIG. 13, since the light source device main body 41A is set to the position condition according to the displacement of the center position O of the arc D from the first focal position F1 with the lamp housing 514, the part R1 of the luminous flux output from the light source device main body 41A via the parallelizing concave lens 413 can be corrected so as to pass close to the lens optical axis LA2 of the microlens 421A of the first lens array 421 provided in the latter part of the light path of the light source device 51. That is, the optical axis of the luminous flux (part R0 and the like of the luminous flux) output from the light source device 51 can be corrected so as to be nearly coaxial with the lens optical axes (lens optical axis LA2 etc.) of the respective microlenses 421A of the first lens array 421 provided in the latter part of the optical path of the light source device 51. Accordingly, when the projector 1 is in the ceiling suspension position as well as when the projector 1 is in the desktop mount position, images of the respective microlenses 421A of the first lens array 421 can be effectively formed on the liquid crystal panels 451 by the second lens array 422 and the superimposing lens 424, and the use efficiency of light can be improved by effectively applying the luminous fluxes output from the light source device 51 to the liquid crystal panels 451.

Further, in comparison to the previous structure that rotates the lamp unit with the optical axis as the center axis, this structure rotates the light source device main body 41A around the rotation shafts 515 nearly perpendicular to the illumination optical axis A and the vertical direction, and thereby, the position change of the light source device main body 41A can be easily performed and the improvement in the use efficiency of light can be realized without upsizing the light source device 51 but with a simpler structure.

Here, when the projector 1 is installed in the desktop mount position, the light source device main body 41A is located in a predetermined rotation position by the elastic force of the elastic members 516, and the illumination optical axis A of the light source device main body 41A and the lens optical axis LA1 of the parallelizing concave lens 413 can be located coaxial with each other. Accordingly, when the projector 1 is in the desktop mount position, the optical axis of the luminous flux (part R0 and the like of the luminous flux) output from the light source device 51 is made nearly coaxial with the lens optical axes (lens optical axis LA1 etc.) of the respective microlenses 421A of the first lens array 421 provided in the latter part of the optical path of the light source device 51 with the simple structure, and the use efficiency of light can be improved.

Further, when the projector 1 is installed in the ceiling suspension position, the leading end portion of the ceiling suspension screw 120 that forms the ceiling suspension device 100 is screwed in the mounting hole 2A, the leading end portion of the ceiling suspension screw 120 is in contact with the pressing surface 4125A of the elliptic reflector 412 for pressing the light source device main body 41A, and thereby, the light source device main body 41A can be rotated against the elastic force of the elastic members 516. That is, as shown in FIG. 13, the light source device main body 41A is rotated so that the leading end side in the luminous flux exiting direction of the light source device main body 41A may be upper in the vertical direction at the time of the ceiling suspension position and the base end side in the luminous flux exiting direction may be lower in the vertical direction at the time of the ceiling suspension position, and thereby, the incident position of the part R1 of the luminous flux to the parallelizing concave lens 413 is moved upwardly in the vertical direction and the part R1 of the luminous flux via the parallelizing concave lens 413 can be corrected so as to pass close to the lens optical axis LA2 of the microlens 421A of the first lens array 421. That is, the optical axis of the luminous flux (part R0 and the like of the luminous flux) output from the light source device 51 can be corrected so as to be nearly coaxial with the lens optical axes (lens optical axis LA2 etc.) of the respective microlenses 421A of the first lens array 421 provided in the latter part of the optical path of the light source device 51.

Therefore, the use efficiency of light can be improved by rotating the light source device main body 41A with simple operation according to the desktop mount position and the ceiling suspension position of the projector 1.

Further, since the light source device main body 41A and the parallelizing concave lens 413 are integrated (unitized) by the lamp housing 514, when the light source device 51 is manufactured, the rotation position of the light source device main body 41A relative to the parallelizing concave lens 413 when the projector 1 is in the desktop mount position and the rotation position of the light source device main body 41A relative to the parallelizing concave lens 413 when the projector 1 is in the ceiling suspension position can be easily set.

Note that the invention is not limited to the above described embodiments, and the invention includes modifications, improvements, and the like within the scope of the invention.

In the respective embodiments, the light source device main body 41A and the parallelizing concave lens 413 are integrated by the lamp housings 414, 514, however, not limited to that, the light source device main body 41A and the parallelizing concave lens 413 may not be integrated, but may be separately provided.

In the first embodiment, the concave lens holder 4142 is supported movable in the vertical direction at the times of desktop mount position and ceiling suspension position relative to the lamp housing main body 4141 via the two coil springs 4143, however, not limited to that, the two coil springs 4143 may be omitted and the concave lens holder 4142 may be supported by the lamp housing main body 4141 movably in the vertical direction by its own weight.

For example, in the lamp housing main body 4141, the first movement end position (the movement end position at the time of the desktop mount position) and the second movement end position (the movement end position at the time of the ceiling suspension position) when the concave lens holder 4142 moves in the vertical direction by its own weight are formed. By the formation, the concave lens holder 4142 moves to the first movement end position when the projector 1 is in the desktop mount position by its own weight and the concave lens holder 4142 moves to the second movement end position when the projector 1 is in the ceiling suspension position by is own weight.

Here, when the projector 1 is in the desktop mount position, as shown in FIG. 8, the first movement end position is set so that the illumination optical axis A and the lens optical axis LA1 of the parallelizing concave lens 413 may be coaxial.

Further, when the projector 1 is in the ceiling suspension position, as shown in FIG. 10, the second movement end position is set so that the part R1 of the luminous flux output from the light source device main body 41A via the parallelizing concave lens 413 may pass close to the lens optical axis LA2 of the microlens 421A of the first lens array 421.

In the structure, there is no need for operation by the user according to the desktop mount position and the ceiling suspension position of the projector 1, and the use efficiency of light can be improved by moving the concave lens holder 4142 with a simple structure.

In the first embodiment, as the position adjustment of the concave lens holder 4142, the parallelizing concave lens 413 is made movable in the vertical direction at the times of desktop mount position and ceiling suspension position, however, not limited to that, the lens optical axis LA1 of the parallelizing concave lens 413 may be slanted relative to the illumination optical axis A.

Figure 14:
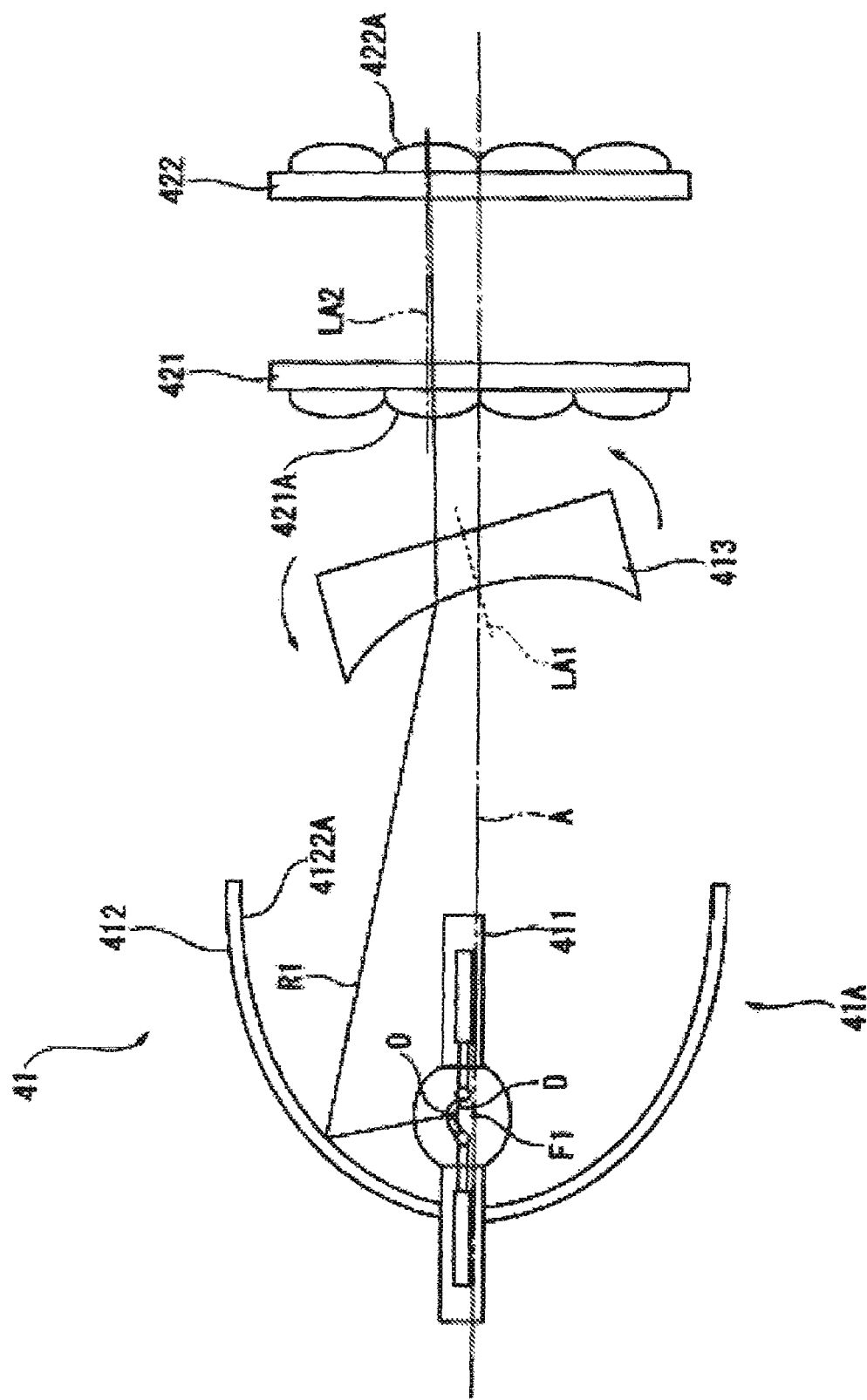
FIG. 14 shows a modified example of the first embodiment.

FIG. 14 shows a modified example of the first embodiment. Specifically, FIG. 14 schematically shows a locus of a luminous flux output from the arc D of the light source lamp 411 toward the first lens array 421 and the second lens array 422 provided in the latter part of the optical path of the light source device 51 when the projector 1 is in the ceiling suspension position and the position adjustment of the light source device main body 41A is performed.

For example, as shown in FIG. 14, when the projector 1 is in the ceiling suspension position, the concave lens holder 4142 is slanted and the lens optical axis LA1 of the parallelizing concave lens 413 is slanted relative to the illumination optical axis A. Thus, even when the position of the parallelizing concave lens 413 is adjusted, as shown in FIG. 14, as well as in the first embodiment, the incident angle of the part R1 of the luminous flux to the parallelizing concave lens 413 becomes larger and the part R1 of the luminous flux via the parallelizing concave lens 413 can be corrected so as to pass close to the lens optical axis LA2 of the microlens 421A of the first lens array 421.

In the second embodiment, the light source device main body 41A is rotatably supported by the lamp housing 514, the pair of rotation shafts 515, and the elastic members 516, however, not limited to that, for example, the elastic members 516 may be omitted, and the position of the center of gravity of the light source device main body 41A may be provided in a position displaced from a straight line connecting the pair of rotation shafts 515 and may be made rotatable around the pair of rotation shafts 515 relative to the lamp housing 514 by its own weight.

For example, in the lamp housing 514, the first rotation end position (the rotation end position at the time of the desktop mount position) and the second rotation end position (the rotation end position at the time of the ceiling suspension position) when the light source device main body 41A rotates by its own weight are formed. By the formation, the light source device main body 41A rotates to the first rotation end position by its own weight when the projector 1 is in the desktop mount position and the light source device main body 41A rotates to the second rotation end position by its own weight when the projector 1 is in the ceiling suspension position.

Here, when the projector 1 is in the desktop mount position, as shown in FIG. 8, the first rotation end position is set so that the illumination optical axis A and the lens optical axis LA1 of the parallelizing concave lens 413 may be coaxial.

Further, when the projector 1 is in the ceiling suspension position, as shown in FIG. 13, the second rotation end position is set so that the part R1 of the luminous flux output from the light source device main body 41A via the parallelizing concave lens 413 may pass close to the lens optical axis LA2 of the microlens 421A of the first lens array 421.

In the structure, there is no need for operation by the user according to the desktop mount position and the ceiling suspension position of the projector 1, and the use efficiency of light can be improved by rotating the light source device main body 41A with a simple structure.

In the respective embodiments, the position adjustment of the parallelizing concave lens 413 and the position adjustment of the light source device main body 41A are performed by pressing the pressing surfaces 4142C1, 4125A with the leading end portion of the ceiling suspension screw 120, however, not limited to that. For example, the ceiling suspension screw 120 may be screwed with the operation part 4142C and the pressing part 4125 and the position adjustment of the parallelizing concave lens 413 and the position adjustment of the light source device main body 41A may be performed by changing the screwed condition of the ceiling suspension screw 120 and the operation part 4142C or the pressing part 4125.

In the respective embodiments and the above described modified example, when the projector 1 is in the ceiling suspension position, the position adjustment of the parallelizing concave lens 413 and the position adjustment of the light source device main body 41A are performed by the interaction (pressing and screwed) between the ceiling suspension screw 120 and the operation part 4142C and the pressing part 4125, however, not limited to that. For example, a drive part of a motor for moving the concave lens holder 4142 and a drive part of a motor or the like for rotating the light source device main body 41A may be provided within the projector 1, and the position adjustment of the parallelizing concave lens 413 and the position adjustment of the light source device main body 41A may be performed by driving the drive parts with the operation of the setting input part by the user.

In the respective embodiments, the projector 1 using three liquid crystal panels 451 is described, however, not limited to that. For example, a projector using one liquid crystal panel, a projector using two liquid crystal panels, or a projector using four or more liquid crystal panels may be applied. Further, the transmissive liquid crystal panels 451 are adopted, however, not limited to that, reflective liquid crystal panels may be used, or a digital micromirror device (trademark of Texas Instruments Inc). may be adopted. When the digital micromirror device is adopted, the light incident-side polarizers 452 and light exiting-side polarizers 453 are not required.

In the embodiments, the optical unit 4 has nearly an L-shape in the plan view, however, other shapes may be adopted, and it may have nearly a U-shape in the plan view, for example.

Although the best configuration for implementing the invention has been disclosed in the above description, the invention is not limited to that. That is, the invention has been mainly illustrated and described regarding the specific embodiments, the person skilled in the art can make various changes to the above described embodiments in shapes, materials, number of members, and other detailed configuration without departing from the technical sprit and purpose of the invention.

Therefore, since the description that limits the shapes, materials, and the like disclosed as above have been illustrated for easy understanding of the invention but not for limiting the invention, the invention includes the description in names of the members without part or all of the limitations of the shapes, materials, and the like.

Since the projector according to an embodiment of the invention is able to improve the use efficiency of light according to the desktop mount position and the ceiling suspension position with a light source device that has a smaller size and a simple structure, it is useful as a projector used for presentation and home theater.

The entire disclosure of Japanese Patent Application No. 2005-318195, filed Nov. 1, 2005 is expressly incorporated by reference herein.

What is claimed is:

1. A projector comprising:
   a light source device;
   a light modulation device that modulates a luminous flux output from the light source device;
   a projection optical device that magnifies and projects the luminous flux modulated in the light modulation device; and
   an exterior casing that accommodates the light source device, the light modulation device, and the projection optical device arranged within,
   the projector arranged so as to be installed in a desktop mount position in which the projector is mounted on a predetermined location and a ceiling suspension position in which the projector is provided opposite in the vertical direction relative to the desktop mount position,
   the light source device including a light source device main body having a light source lamp in which discharge emission is performed between a pair of electrodes and an elliptic reflector having a nearly ellipsoidal reflection surface and converging and outputting a luminous flux radiated from the light source lamp in a certain direction, and a parallelizing lens that parallelizes the converged light of the elliptic reflector, wherein
   a lens supporting part that supports the parallelizing lens and makes a position of the parallelizing lens relative to the light source device main body changeable according to the position of the projector is provided,
   the lens supporting part is arranged so as to be movable in the vertical direction, an elastic member that locates the lens supporting part in a predetermined position in the vertical direction by elastic force is provided,
a pressing surface extending nearly perpendicularly to the vertical direction is formed in the lens supporting part, and
an operation hole for moving the lens supporting part against the elastic force of the elastic member to a position in planar interference with the pressing surface in the vertical direction is formed in a bottom face in the exterior casing.

2. A projector comprising:
a light source device;
a light modulation device that modulates a luminous flux output from the light source device;
a projection optical device that magnifies and projects the luminous flux modulated in the light modulation device; and
an exterior casing that accommodates the light source device, the light modulation device, and the projection optical device arranged within,
the projector arranged so as to be installed in a desktop mount position in which the projector is mounted on a predetermined location and a ceiling suspension position in which the projector is provided opposite in the vertical direction relative to the desktop mount position,
the light source device including a light source device main body having a light source lamp in which discharge emission is performed between a pair of electrodes and an elliptic reflector having a nearly ellipsoidal reflection surface and converging and outputting a luminous flux radiated from the light source lamp in a certain direction, and a parallelizing lens that parallelizes the converged light of the elliptic reflector, wherein
a lens supporting part that supports the parallelizing lens and makes a position of the parallelizing lens relative to the light source device main body changeable according to the position of the projector is provided, and
the lens supporting part is arranged so as to be movable in the vertical direction by its own weight.

* * * * *